United States Patent
Fang et al.

(10) Patent No.: US 11,436,615 B2
(45) Date of Patent: Sep. 6, 2022

(54) SYSTEM AND METHOD FOR BLOCKCHAIN TRANSACTION RISK MANAGEMENT USING MACHINE LEARNING

(71) Applicant: Anchain.ai Inc., San Jose, CA (US)

(72) Inventors: Chunsheng Victor Fang, San Jose, CA (US); Wei Quan, San Jose, CA (US); Ben Binyi Wu, San Jose, CA (US)

(73) Assignee: Anchain.ai Inc., San Jose, CA (US)

( * ) Notice: Subject to any disclaimer, the term of this patent is extended or adjusted under 35 U.S.C. 154(b) by 239 days.

(21) Appl. No.: 17/006,431

(22) Filed: Aug. 28, 2020

(65) Prior Publication Data
US 2022/0067752 A1    Mar. 3, 2022

(51) Int. Cl.
| | |
|---|---|
| G06Q 30/00 | (2012.01) |
| G06Q 20/36 | (2012.01) |
| G06Q 20/40 | (2012.01) |
| G06Q 40/04 | (2012.01) |
| G06Q 10/10 | (2012.01) |
| G06Q 20/06 | (2012.01) |
| G06F 16/23 | (2019.01) |
| H04L 9/40 | (2022.01) |

(Continued)

(52) U.S. Cl.
CPC ..... G06Q 30/0185 (2013.01); G06F 16/2379 (2019.01); G06N 20/00 (2019.01); G06Q 10/10 (2013.01); G06Q 20/0655 (2013.01); G06Q 20/3674 (2013.01); G06Q 20/405 (2013.01); G06Q 20/4016 (2013.01); G06Q 40/04 (2013.01); G06Q 50/265 (2013.01); H04L 63/20 (2013.01); G06Q 2220/00 (2013.01)

(58) Field of Classification Search
CPC ........ G06Q 30/00; G06Q 20/36; G06Q 20/40; G06Q 40/04; G06Q 50/26; G06Q 10/10; G06Q 20/06; G06F 16/23; H04L 29/06; G06N 20/00
See application file for complete search history.

(56) References Cited

U.S. PATENT DOCUMENTS

| | | | |
|---|---|---|---|
| 2021/0042421 A1* | 2/2021 | Li | H04L 9/50 |
| 2021/0110047 A1* | 4/2021 | Fang | H04L 9/50 |

(Continued)

OTHER PUBLICATIONS

Machine Learning in/for Blockchain: Future and Challenges Chen.

*Primary Examiner* — Scott S Trotter
(74) *Attorney, Agent, or Firm* — Rowan TELS LLC

(57) ABSTRACT

A method involves receiving digital on blockchain information and digital off blockchain information. The digital data from the digital on blockchain information and the digital off blockchain information is extracted. The entity knowledge base engine contextualizes the relationships based on the digital data and the digital off blockchain information and the digital on blockchain information. The risk classification engine analyzes the digital data and transforms the digital data to an identified behavior category. The risk scoring regression engine analyzes the classified risk data and assigns a risk score to each classified risk data. The risk policy engine analyzes the classified risk data and determines if any deviations from rules or standards have or will occur. The security control system takes an action on the digital on blockchain information and digital off blockchain information based on the assigned risk score and any deviations from rules or standards.

20 Claims, 17 Drawing Sheets

(51) Int. Cl.
 *G06N 20/00* (2019.01)
 *G06Q 50/26* (2012.01)

(56) References Cited

U.S. PATENT DOCUMENTS

2021/0182859 A1* 6/2021 Srinivasa Rao ....... G06N 20/20
2021/0390549 A1* 12/2021 Rule ................... H04L 67/1057

* cited by examiner

SYSTEM AND METHOD FOR BLOCKCHAIN TRANSACTION RISK MANAGEMENT USING MACHINE LEARNING

BACKGROUND

Cryptocurrency offers a decentralized system to exchanges funds in the form of digital assets. Due to the decentralized nature of the blockchain, tracing the origin of the funds and final destination of transactions can be difficult. However, as the value of cryptocurrency has risen, individuals and organizations have emerged that attempt to utilize this system to transfer funds to malicious entities or launder funds to hide the illicit origin of the funds. Due to the potential risks associated with cryptocurrency, regulations have been emplaced to prevent the money laundering and the funding of terrorism. Many legitimate cryptocurrency exchanges are required to comply with the regulations if they wish to continue to operate but struggle to identify transactions or accounts that may potentially violate these regulations placing them at risk of not complying with the regulations. Therefore, a need exists for a way to identify transactions and/or accounts that carry an increased risk of violating financial regulations.

BRIEF SUMMARY

A method of operating a risk management system for blockchain digital assets involves receiving digital on blockchain information and digital off blockchain information, wherein the receiving includes a digital asset intake engine. The method involves extracting digital data from the digital on blockchain information and the digital off blockchain information. In the method, an entity knowledge base contextualizes relationships based on the digital data and the digital off blockchain information and the digital on blockchain information. A risk classification engine including a machine learning model, analyzes the digital data and transforms the digital data to an identified behavior category, thereby creating classified risk data. A risk scoring regression engine with machine learning analyzes the classified risk data and assigns a risk score to each classified risk data. A risk policy engine analyzes the classified risk data and determines if any deviations from rules or standards have or will occur, wherein the risk policy engine is a rules based engine. A security control system takes an action on the digital on blockchain information and digital off blockchain information based on the assigned risk score and any deviations from rules or standards. The action by the security control system includes, on condition the risk score is high, at least one of blocking a blockchain transaction, freezing user assets, or suspending user accounts related to the blockchain transaction. On condition the risk score is normal, the action approves the blockchain transaction.

A risk management system for blockchain digital assets comprises a digital asset intake engine, an entity knowledge base engine, a risk classification engine, a risk scoring regression engine, a risk policy engine, and a security control system. The digital asset intake engine is configured to receive digital on blockchain information and digital off blockchain information, and extract digital data from the digital on blockchain information and the digital off blockchain information. The entity knowledge base engine is configured to contextualize relationships based on the digital data and the digital off blockchain information and the digital on blockchain information. The risk classification engine includes a machine learning model and is configured to analyze the digital data and transform the digital data to an identified behavior category, thereby creating classified risk data. The risk scoring regression engine includes machine learning and is configured to analyze the classified risk data and assign a risk score to each classified risk data. The risk policy engine is a rules based engine. The security control system is configured to take an action on the digital on blockchain information and digital off blockchain information based on the assigned risk score. The action by the security control system includes, on condition the risk score is high, at least one of blocking a blockchain transaction, freezing user assets, or suspending user accounts related to the blockchain transaction. On condition the risk score is normal, the action approves the blockchain transaction.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
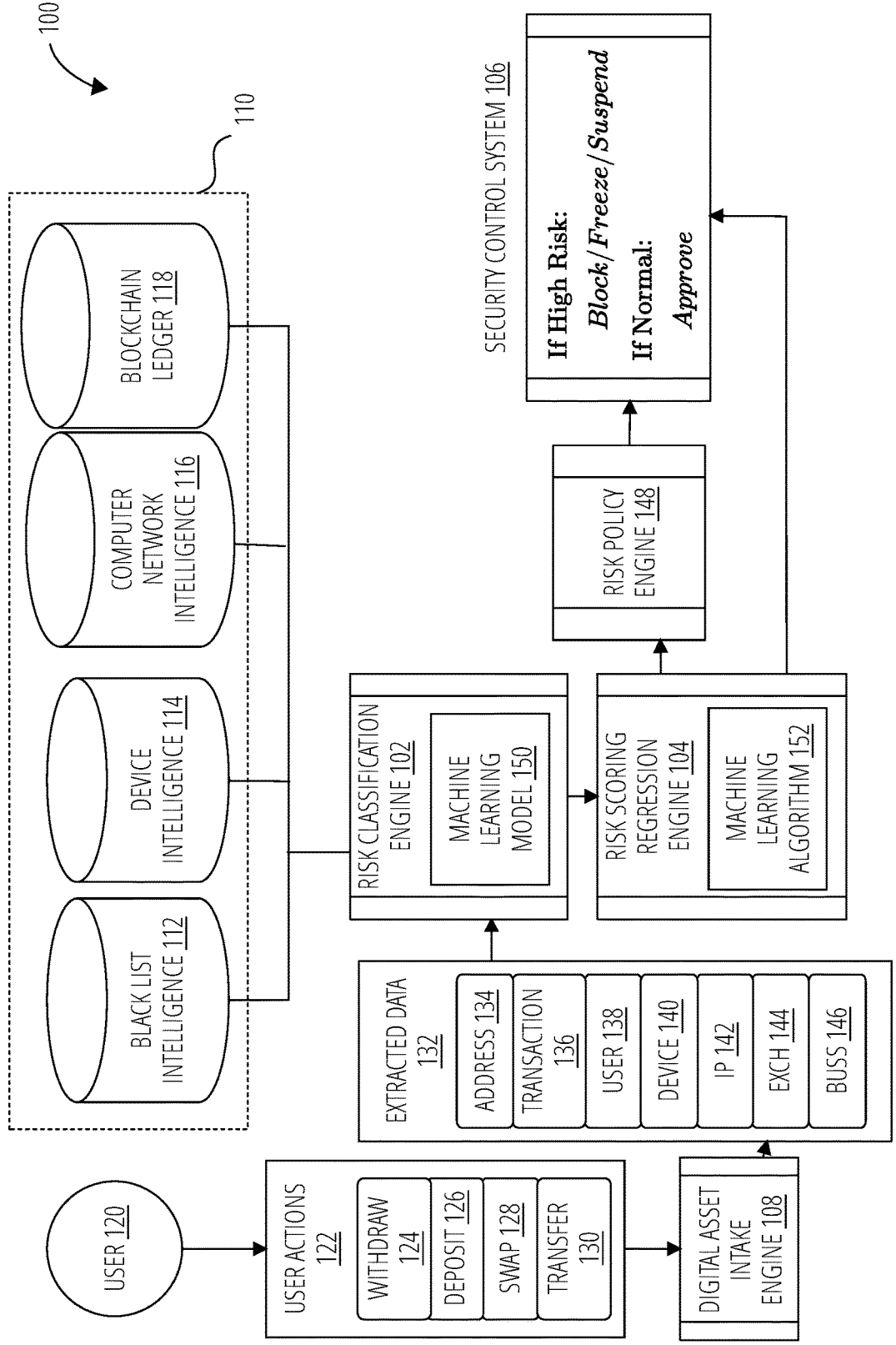
FIG. 1 illustrates a system 100 in accordance with one embodiment.

A system and method for blockchain transaction risk management using machine learning provides security for individuals or entities that deal with blockchain related transactions. The system and method can make real time predictions and suspend a suspicious cryptocurrency transfer transaction from the user to an unknown wallet address that has observed strong linkage with a known terrorist. The system and method can detect suspicious behaviors based on historic transactions such as frequent attempts to exploit the blockchain systems, which will generate a high risk score to block this transaction.

Monitoring a decentralized system such as a blockchain can be difficult due to their nature. As the monetary value of the digital assets increases the need to identify suspicious transactions becomes more important to ensure the exchange is not being used to for money laundering or financing terrorism. The systems and methods in this disclosure allow for regulatory compliance on Anti-Money Laundering, and Counter Terrorism Financing (AML/CFT) by identifying risky transactions associated with a cryptocurrency exchange to block the transaction, as well as freeze or suspend the accounts.

Existing applications such as blacklisted blockchain addresses or sanctioned terrorists' personal information lack of adaptability to new emerging risks.

By leveraging machine learning to analyze the behaviors, combining on-blockchain and off-blockchain data sources, the methods and systems of this disclosure may be more accurate, have higher coverage, and may be more preventive.

A method of operating a risk management system for blockchain digital assets involves receiving digital on blockchain information and digital off blockchain information, wherein the receiving includes a digital asset intake engine. The method involves extracting digital data from the digital on blockchain information and the digital off blockchain information. In the method, an entity knowledge base contextualizes relationships based on the digital data and the digital off blockchain information and the digital on blockchain information. A risk classification engine including a machine learning model, analyzes the digital data and transforms the digital data to an identified behavior category, thereby creating classified risk data. A risk scoring regression engine with machine learning analyzes the classified risk data and assigns a risk score to each classified risk data. A risk policy engine analyzes the classified risk data and determines if any deviations from rules or standards have or will occur, wherein the risk policy engine is a rules based engine. A security control system takes an action on the digital on blockchain information and digital off blockchain information based on the assigned risk score and any deviations from rules or standards. The action includes a security control system, where on condition the risk score is high, the action at least one of blocks a blockchain transaction, freezes user assets, or suspends user accounts related to the blockchain transaction. On condition the risk score is normal, the action approves the blockchain transaction.

In some configurations, the digital on blockchain information and digital off blockchain information include blockchain address, transaction identification, user information, device information, device IP address, business type, and exchange or custodian determination. Custodians are third-parties that store digital assets for users.

In some configurations, the entity knowledge base includes a blacklist intelligence database, a device intelligence database, a computer network intelligence database, and a blockchain ledger.

In some configurations, the risk classification engine includes a decision tree classification model.

In some configurations the machine learning model includes at least one of a machine learning classification model and a risk score model to calculate the risk score.

In some configurations, the machine learning classification model is an AutoML model. The operation of the AutoML model involves preparing a labeled dataset, preprocessing the labeled dataset, extracting AutoML features, transforming AutoML features, training an AutoML model, evaluating metrics of the AutoML model, selecting a best machine learning model using an automated selection process, and serializing the best machine learning model.

In some configurations, the AutoML model may be utilized as an offline training pipeline or an online prediction pipeline in the cloud or a decentralized blockchain node. The offline training pipeline may involve feature extraction and transformation, parallel model training, model metric evaluation, and model selection. The online prediction pipeline may involve feature extraction and transformation, model prediction, and result formatting.

In some configurations, the machine learning classification model is a behavior based model and may involve recognizing behavioral characteristics in at least one feature category for an entity. These feature categories include a statistics feature category, a topology feature category, a temporal feature category, a temporal feature category, a linkage feature category, a derived feature category, a sequential feature category. The machine learning classification model may also identify exchange behavioral wallet addresses using exchange behavior characteristics, a money laundering behavioral address, a bot behavioral address, and a bad actor group cluster.

In some configurations, the machine learning classification model is a regression model for the risk score. The regression model may include input features comprising at least one of a blockchain transaction and an external information related to blockchain addresses. The regression model may also include parameters including a time decaying factor lambda. The regression model may also include an output including risk score of the address, reasons for the prediction, and a suspicious transaction summary.

A risk management system for blockchain digital assets comprises a digital asset intake engine, an entity knowledge base engine, a risk classification engine, a risk scoring regression engine, a risk policy engine, and a security control system. The digital asset intake engine is configured to receive digital on blockchain information and digital off blockchain information, and extract digital data from the digital on blockchain information and the digital off blockchain information. The entity knowledge base engine is configured to contextualize relationships based on the digital data and the digital off blockchain information and the digital on blockchain information. The risk classification engine includes a machine learning model and is configured to analyze the digital data and transform the digital data to an identified behavior category, thereby creating classified risk data. The risk scoring regression engine includes machine learning and is configured to analyze the classified risk data and assign a risk score to each classified risk data. The risk policy engine is a rules based engine. The security control system is configured to take an action on the digital on blockchain information and digital off blockchain information based on the assigned risk score. The action by the security control system includes, on condition the risk score is high, at least one of blocking a blockchain transaction, freezing user assets, or suspending user accounts related to the blockchain transaction. On condition the risk score is normal, the action approves the blockchain transaction.

In some configurations, the digital asset intake engine includes blockchain address, transaction identification, user information, device information, device IP address, business type, exchange or custodian.

In some configurations, the entity knowledge base includes a blacklist intelligence database, a device intelligence database, a computer network intelligence database, and a blockchain ledger.

In some configurations, the knowledge base engine updates the information upon receiving threat intelligence to include a reentrancy vulnerability pattern.

In some configurations, the risk classification engine includes a decision tree classification model.

In some configurations, the risk scoring regression engine includes a machine learning classification model and a risk score model to calculate the risk score.

In some configurations, the machine learning model includes at least one of a machine learning classification model and a risk score model to calculate the risk score.

In some configurations, the machine learning classification model is an AutoML model involves preparing a labeled dataset, pre-processing the labeled dataset, extracting AutoML features, transforming AutoML features, training an AutoML model, evaluating metrics of the AutoML model, selecting a best machine learning model using an automated selection process, and serializing the best machine learning model.

In some configurations, the AutoML model is at least one of an offline training pipeline or an online prediction pipeline in the cloud or a decentralized blockchain node. The offline training pipeline involves feature extraction and transformation, parallel model training, model metric evaluation, and model selection. The online prediction pipeline involves feature extraction and transformation, model prediction, and result formatting.

In some configurations, machine learning classification model is a behavior based model comprising recognizing behavioral characteristics in at least one feature category for an entity and identifying a set of behaviors. The feature categories include a statistics feature category, a topology feature category, a temporal feature category, a temporal feature category, a linkage feature category, a derived feature category, and a sequential feature category. The set of behaviors includes exchange behavioral wallet addresses using exchange behavior characteristics, a money laundering behavioral address, a bot behavioral address, and a bad actor group cluster.

In some configurations, the machine learning classification model is a regression model for the risk score. The regression model includes input features comprising at least one of blockchain transactions and external information related to blockchain addresses. The regression model includes parameters including a time decaying factor lambda. The regression model includes outputs such as risk score of the address, reasons for the prediction, and suspicious transaction summary.

FIG. 1 illustrates a system 100 for blockchain transaction risk management. The system 100 comprises a digital asset intake engine 108, a risk classification engine 102, a risk scoring regression engine 104, a risk policy engine 148, a security control system 106, and an entity knowledge base engine 110. The risk classification engine 102 comprises a machine learning model 150. The risk scoring regression engine 104 comprises a machine learning algorithm 152. The entity knowledge base engine 110 comprise a black list intelligence database 112, a device intelligence database 114, a computer network intelligence database 116, and a blockchain ledger 118.

The digital asset intake engine 108 is configured to receive digital on blockchain information and digital off blockchain information, and extract digital data from the digital on blockchain information and the digital off blockchain information. The entity knowledge base engine 110 is configured to contextualize relationships based on the digital data and the digital off blockchain information and the digital on blockchain information. The risk classification engine 102 includes a machine learning model and is configured to analyze the digital data and transform the digital data to an identified behavior category, thereby creating classified risk data. The risk scoring regression engine 104 includes machine learning and is configured to analyze the classified risk data and assign a risk score to each classified risk data.

The risk policy engine 148 is a rules based engine. The security control system 106 configured to take an action on the digital on blockchain information and digital off blockchain information based on the assigned risk score.

In the system 100, a user 120 performs a set of user actions 122 comprising a withdraw 124, a deposit 126, a swap 128, and/or a transfer 130, of funds or cryptocurrency. These actions are understood as digital on blockchain information and digital off blockchain information and are received by a digital asset intake engine 108. The digital asset intake engine 108 extracts data (extracted data 132), which pulls out the digital data and the digital off blockchain information and the digital on blockchain information that includes a blockchain address 134, a transaction identification 136, a user information 138, a device information 140, a business type 146, and a device IP address 142, as well as the exchange or custodian information 144, associated with the user 120's actions. The data pulled by the digital asset intake engine 108 may be obtained from the cryptocurrency exchange where the user actions 122 were performed or other sources that track these actions. The extracted digital data and the digital off blockchain information and the digital on blockchain information is then contextualized by a risk classification engine 102, which leverages information stored in entity knowledge bases that include black list intelligence database 112, a device intelligence database 114, a computer network intelligence database 116, and a blockchain ledger 118. The risk classification engine 102 analyzes the information stored in the entity knowledge bases to transform the digital data into an identified behavior category, creating classified risk data. The classified risk data is then communicated to a risk scoring regression engine 104 that analyzes the classified risk data and assigns a risk score to each classified risk data. The classified risk data is then communicated to the risk policy engine 148, which is a rules based engine. The classified risk data is then analyzed by the risk policy engine 148 to determine if any deviations from rules or standards have or will occur. The security control system 106 takes an action on the digital on blockchain information and digital off blockchain information based on the assigned risk score and any deviations from rules or standards. For example, if the risk is high, the security control system 106 may block, freeze, or suspend the transaction and/or the account that is performing the actions. If the risk is viewed as normal, the security control system 106 may approve the transaction.

Figure 2:
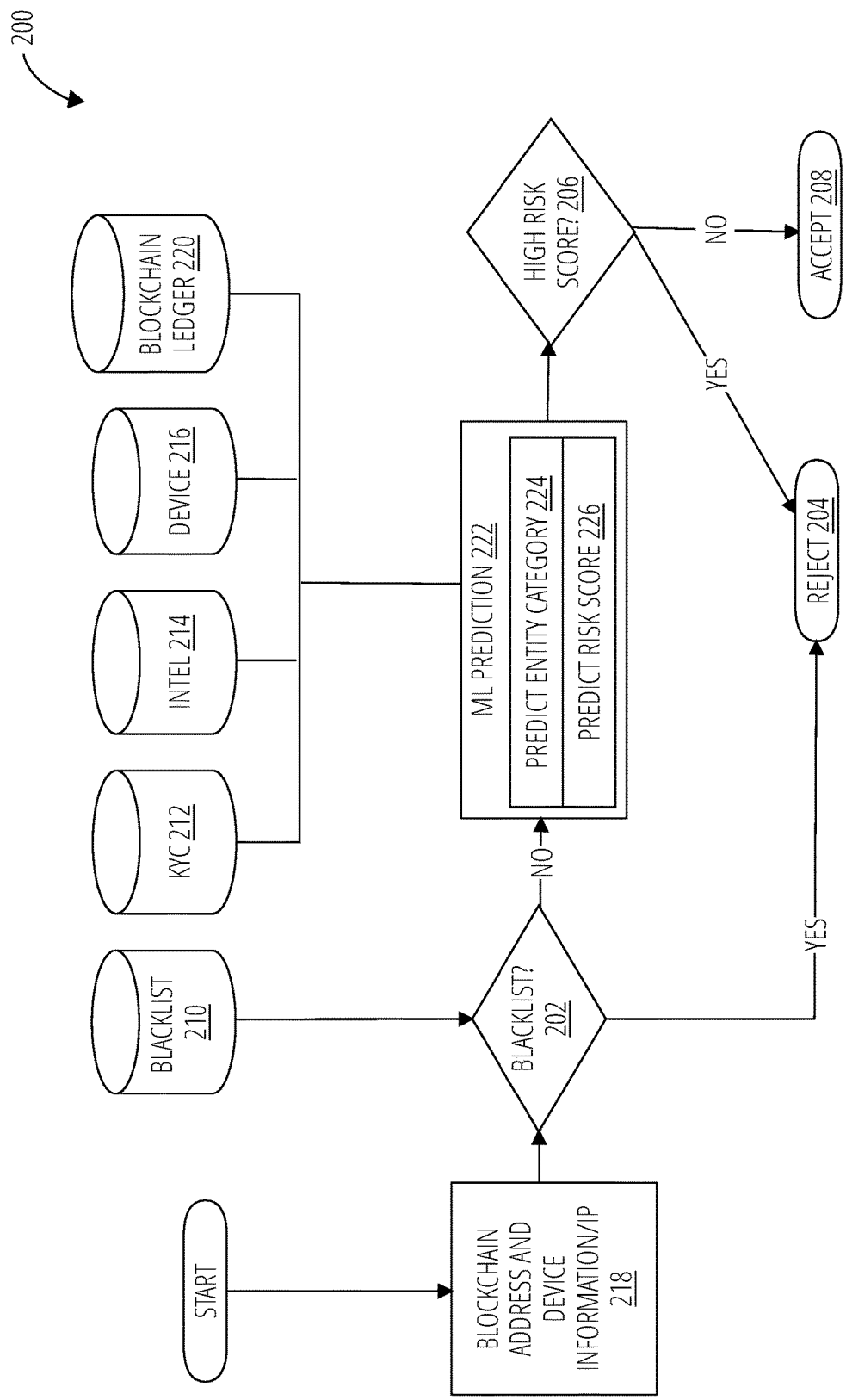
FIG. 2 illustrates a process 200 in accordance with one embodiment.

FIG. 2 illustrates a flow chart for process 200 describing machine learning (ML) Entity categorization and risk engine processes. In the process 200, blockchain address and device information/IP 218 is received following user action on the blockchain or associated with the blockchain on a cryptocurrency exchange. At decision block 202, the blockchain address and device information/IP 218 is analyzed against a blacklist database 210 and a determination is made whether the blockchain address and device information/IP 218 have been blacklisted from operating on the exchange. If the blockchain address and device information/IP 218 has been blacklisted according to the blacklist database 210, the process 200 moves to reject 204 the user action on the exchange. If the blockchain address and device information/IP 218 has not been blacklisted the process moves to block 222 where a machine learning prediction is performed. The machine learning prediction utilizes an entity knowledge base comprising an identity verification database 212, a computer network intelligence database 214, a device intelligence database 216, and the blockchain ledger 220 to predict entity category 224 and predict risk score 226. The process 200 then moves to decision block 206 that determines if the predicted risk score is high. If the risk score is high, the process 200 moves to reject 204 the user action. If the risk score is not high, the process 200 moves to accept 208 the user action.

Figure 3:
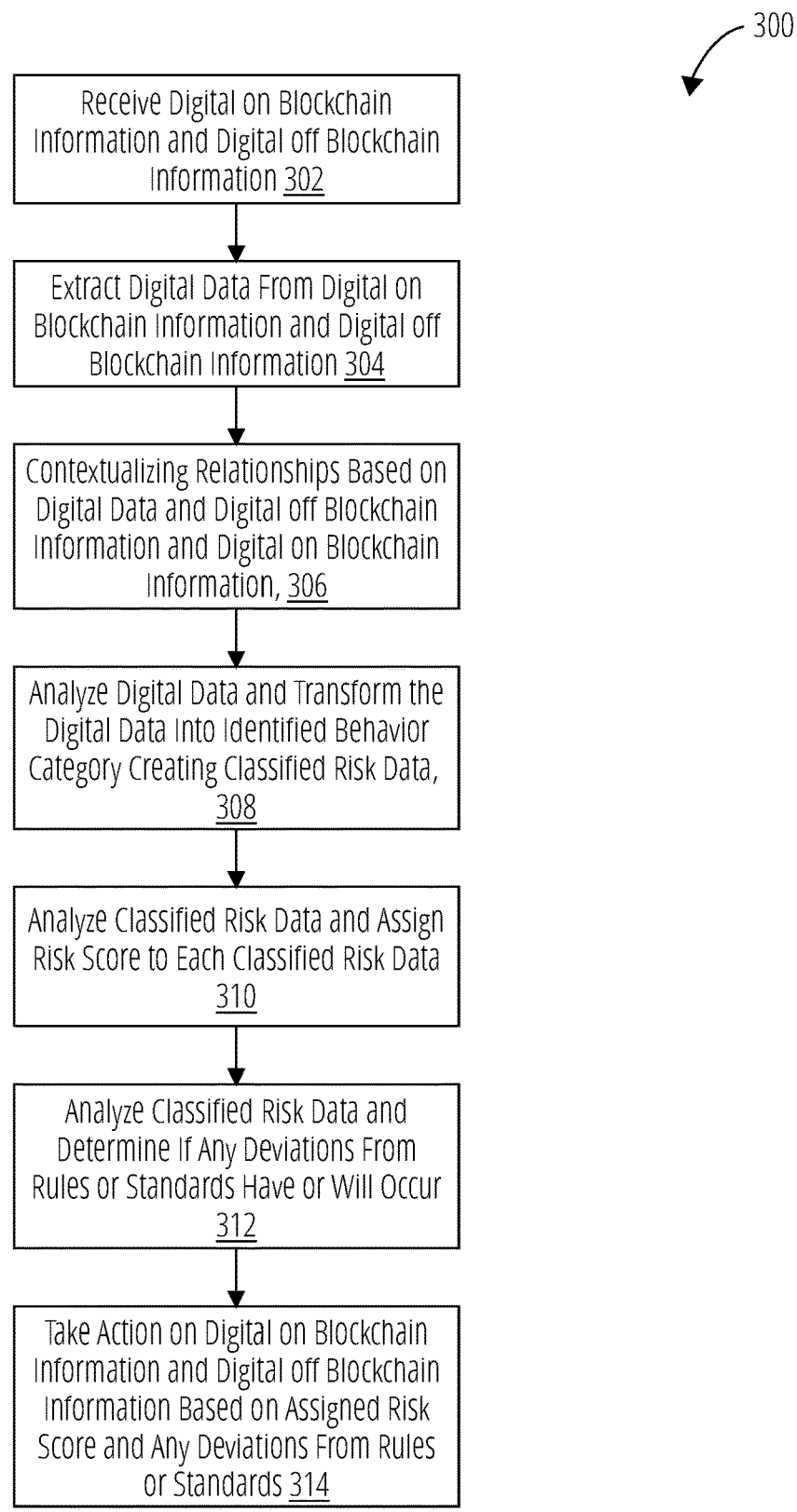
FIG. 3 illustrates a method 300 in accordance with one embodiment.

FIG. 3 illustrates a method 300 for managing risk to a block utilizing machine learning. The method 300 involves receiving digital on blockchain information and digital off blockchain information, wherein the receiving includes a digital asset intake engine (block 302). In block 304, the method 300 extracts digital data from the digital on blockchain information and the digital off blockchain information. In block 306, the method 300 contextualizes relationships based on the digital data and the digital off blockchain information and the digital on blockchain information, the contextualizing includes an entity knowledge base. In block 308, the method 300 analyzes the digital data and transforms the digital data to an identified behavior category, thereby creating classified risk data, wherein the analyzing and transforming includes a risk classification engine including a machine learning model. In block 310, the method 300 analyzes the classified risk data and assigns a risk score to each classified risk data, wherein the analyzing and assigning includes a risk scoring regression engine and machine learning. In block 312, the method 300 analyzes the classified risk data and determines if any deviations from rules or standards have or will occur, wherein the analyzing and determining includes a risk policy engine that is a rules based engine. In block 314, the method 300 takes an action on the digital on blockchain information and digital off blockchain information based on the assigned risk score and any deviations from rules or standards, wherein taking the action includes a security control system.

Figure 4:
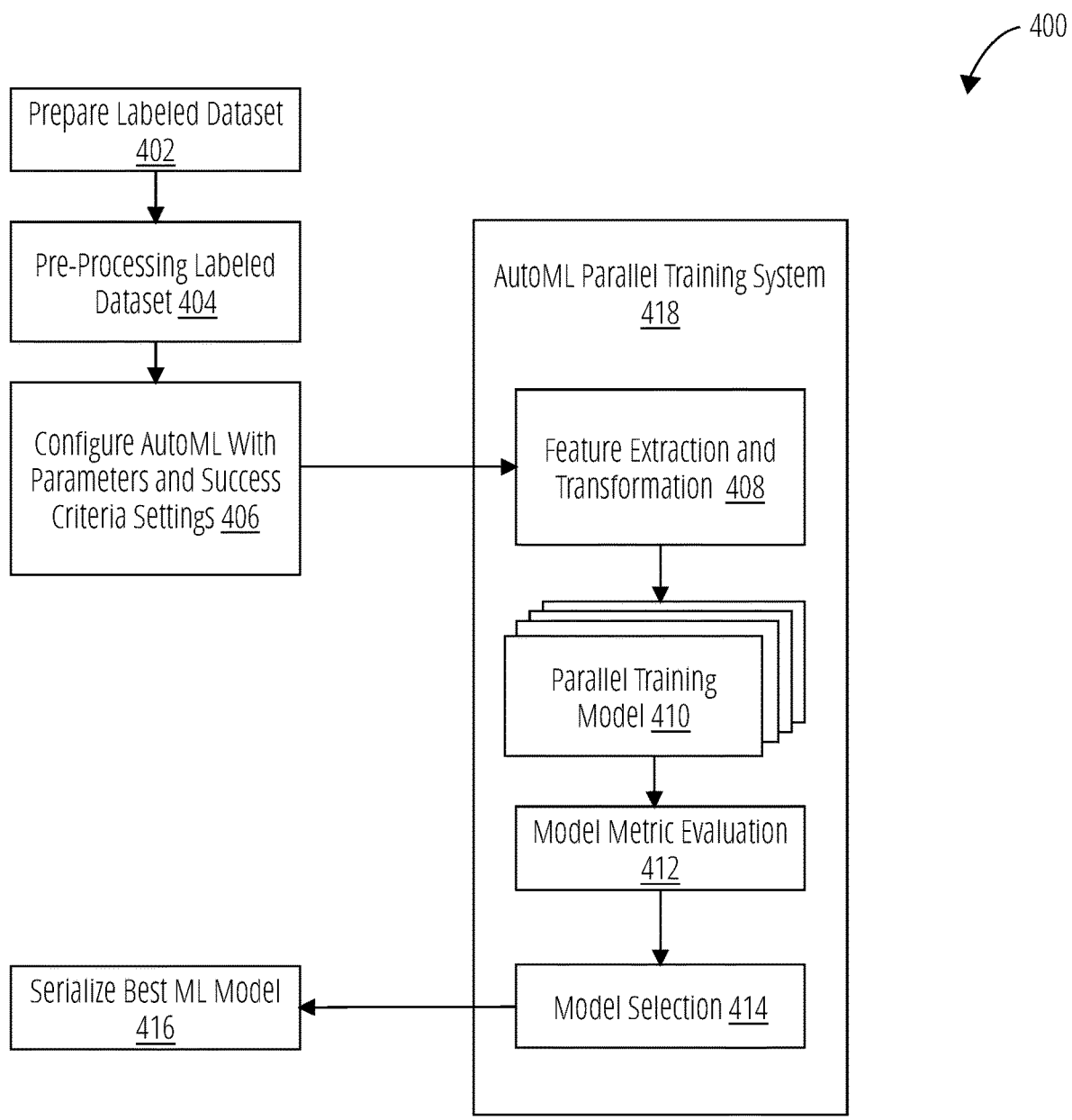
FIG. 4 illustrates method 400 in accordance with one embodiment.

FIG. 4 illustrates a method 400 for training the machine learning classification model in accordance with on embodiment. The method 400 involves preparing a labeled dataset (block 402). The in block 404, the method 400 pre-process the labeled dataset. In block 406, the method 400 configures the AutoML Parallel Training System 418 with parameters and success criteria settings. The method 400 then moves to block 408 where the AutoML features are extracted and transformed. In block 410, the method 400 trains the AutoML model. This training may occur in parallel. In block 412, the method 400 evaluates the metrics of the AutoML model. In block 414, the method 400 selects a best machine learning model using an automated selection process. In the block 416, the method 400 serializes the best machine learning model.

An example of the prepared labeled dataset may be a dataset that includes information such as: A is a hacker address with 100 transactions; B is an exchange wallet address with 2000 transactions.

Pre-processing the labeled data may involve cleaning the data, such removing null values, outliers and normalizing the data into the form for AutoML.

The AutoML parameters and criteria setting may include a computing resource setting, such as how many CPU/RAM/Disks allowed, time setting, such as how much time allowed for training the best ML model, and establishing a success criteria for the winning ML model, such as: AUC >0.99? Precision >95%.

An example of the AutoML feature extraction may be performing a PCA (probably approximately correct learning) for dimensionality reduction. An example of AutoML feature transformation may be a logarithm transformation.

During the AutoML Model training, the selected machine learning model will be run in parallel, and compete to meet the success criteria. The AutoML model training supports all supervised/semi-supervised machine learning models, both Classification and Regression. These models include Tree ensemble models such as Gradient Boosting Trees and Random Forest, GLM Generalized linear models, Support Vector Machines, and Deep learning models such as Convolutional Neural Nets, LSTM, RNN, etc.

During the AutoML Model metric evaluation, any machine learning quantitative evaluation metrics can be adopted. These metrics include Precision, Recall, Accuracy, AUC: Area Under ROC, and F1 scores.

During the AutoML Automated model selection may be determined by criteria of selecting the winning models. In some cases when a time out occurs, the best ML model will still be selected.

The serialization of the best ML model may be done for version control. The winning machine learning model may be selected, serialized into a file, and will thus be ready to be deployed into a prediction pipeline.

In some configurations, the AutoML model may be an offline training pipeline or an online prediction pipeline in the cloud or a decentralized blockchain node. The offline training pipeline includes feature extraction and transformation, parallel model training, model metric evaluation, and model selection. The online prediction pipeline includes feature extraction and transformation, model prediction, and result formatting.

Automated machine learning (AutoML), is a system and methodology that automates various stages of the machine learning process, such as model selection, hyperparameter optimization, etc. The AutoML system takes the labeled data as input, runs a parallel competition to select the best machine learning model that meets the success criteria, and eventually emits a serialized machine learning model that can be deployed in the prediction pipeline.

The advantage of using AutoML is mostly about efficiency. AutoML helps creates high quality ML models quickly, while using minimal data science labors.

AutoML model can be modified to operate similarly to a traditional machine learning model, by limiting the compute resources. For example, AutoML can be configured to use only 1 CPU and train 1 model (say Gradient Boosting Tree) at a time, which is actually a traditional machine learning model.

Figure 5:
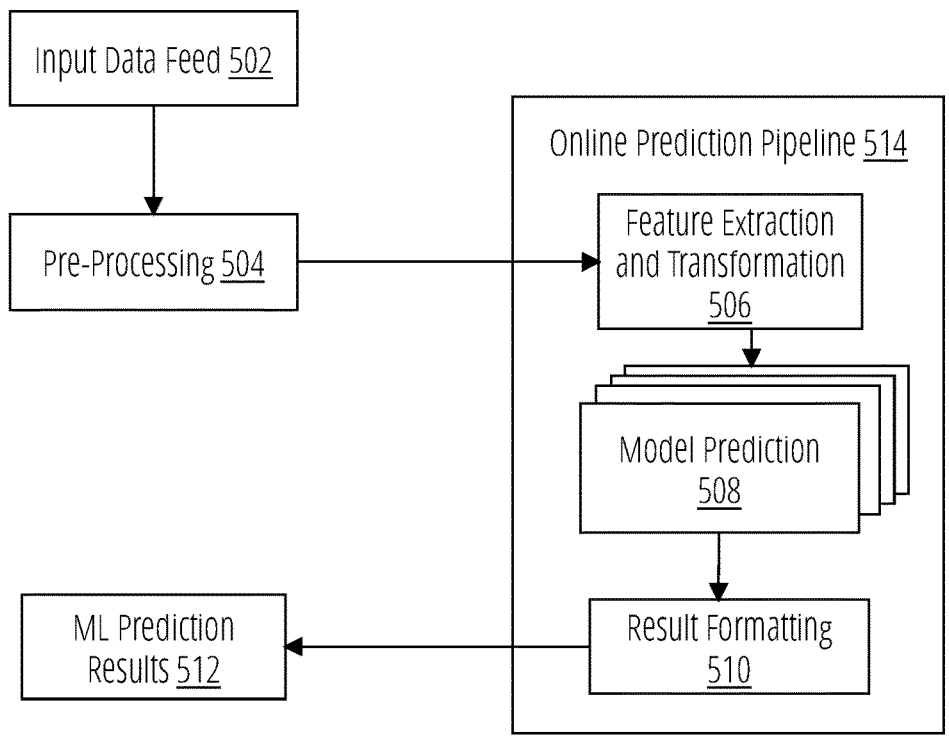
FIG. 5 illustrates method 500 in accordance with one embodiment.

FIG. 5 illustrates a method 500 for operating the AutoML model in accordance with one embodiment. The method 500 involves inputting a data feed (block 502). In block 504, the method 500 preprocess the inputs from the data feed. The preprocessing may involve cleaning the data, such removing null values, outliers and normalizing the data into the form for AutoML. The preprocessed data is then sent to the online prediction pipeline 514. The online prediction pipeline 514 is in the cloud or a decentralized blockchain node. In block 506, the method 500 performs feature extraction and transformation. An example of the AutoML feature extraction may be performing a PCA for dimensionality reduction. An example of AutoML feature transformation may be a logarithm transformation. In block 508, the method 500 performs a model prediction based on one or more models. In block 510, the method 500 formats the results. In block 512, the method 500 exports the machine learning prediction results out of the online prediction pipeline 514.

The online prediction pipeline may be deployed as a de-serialized model file, to the cloud, or through decentralized blockchain deployment. The online prediction pipeline may be utilized to perform data preprocessing, feature extraction and transformation, predictions, and generate results.

The machine learning classification model for blockchain behavioral entities may be utilized to classify a blockchain address into an entity category, based on blockchain transactions, intelligence databases, and other related info.

The machine learning classification model for blockchain behavioral entities may be applied to any blockchain behavioral entities that include crypto exchanges, crypto mixers, bots, hackers, terrorists, and smart contract based decentralized applications.

The advantage of the machine learning classification model is that it can learn from the transaction data mostly by recognizing the specific behavioral characteristics of each entity category. In contrast, the traditional methods maintain a database for addresses with known entities, which has low coverage.

The machine learning model may include feature categories for describing behavior characteristics. These categories include a statistics feature category, a topology feature category, a temporal feature category, a linkage feature category, a derived feature category, and a sequential feature category.

The statistics feature category may include items such as counts of inbound and outbound transactions, a sum of inbound and outbound amounts, maximum transaction amounts, etc.

The topology feature category may include items such as the number of input addresses, graph centrality, etc.

The temporal feature category may include items such as the number of active hours per day, the number of active Mondays in a year, the entropy of the time series range, etc.

The linkage feature category may include items such as the number of connections to known entities in the intelligence database, such as Binance exchange wallets, etc., and the amount sent to known entities, such as exchange wallets, etc.

The derived feature category may include items such as the ratio between outbound and inbound amounts, the ratio between the exchange amount and the hacker amount, etc.

The sequential feature category may include items such as the time interval between 2 consecutive transactions of one address, the percentage of transactions that have the same dollar amount within each rolling time window, etc.

The machine learning model may be utilized to identify exchange behavior addresses. A crypto exchange may have wallet addresses stored as part of their on-blockchain infrastructure. These wallets may also include designations categorizing them as cold or hot deposit wallets. Each cryptocurrency exchange may have different characteristics for making these classifications. Through the use of the machine learning model, predictions can be made to determine and identify exchange behaviors and characteristics associated with the addresses. These exchange behaviors may include a transaction funding amount that is usually substantially large, whether hot wallets tend to be more active, generating a significant amount of transactions, whether hot wallets and cold wallets tend to cluster together, and if there are consistent temporal traits that observe high autocorrelation factors.

The machine learning model may be utilized to identify addresses associated with behaviors such as mixer, tumbler, and money laundering. The mixer, tumbler, or money laundering behavior may be characterized by the fact that most addresses are "pass through" or have "transient" behaviors, such that the funding only stays in a short time interval until all the funds are wired out. Another characterization may be if there are thrown away addresses, or if they are recycled but with repetitive transient patterns. Another characterization may be identifying behavioral traits depending on the blockchain. For example, on Bitcoin there can be certain multisig patterns that can identify the mixers' encryption patterns.

The machine learning model may be utilized to identify bot behavioral addresses. Bot behavior may be characterized by their activity or their active percentage, where the more activity, the higher likelihood the that the actions are being performed by a bot. Another characterization may be done by looking at temporal regularity by auto-correlation such as if there are repeated patterns that hint at bot behavior. Another characterization may be transaction amount distribution entropy. For example, a bot is more likely to bet at a fixed amount, hence low entropy.

When the risk classification engine is informed with suspicious activities, from news or threat researchers, a seed anomaly address can be identified. For example, a group of bad actors may utilize a particular exploit, where if the machine learning model is updated with details regarding the exploit, the machine learning model may identify a cluster of addresses that benefit from the exploit and/or are associated with addresses associated with the group of bad actors.

Figure 6:
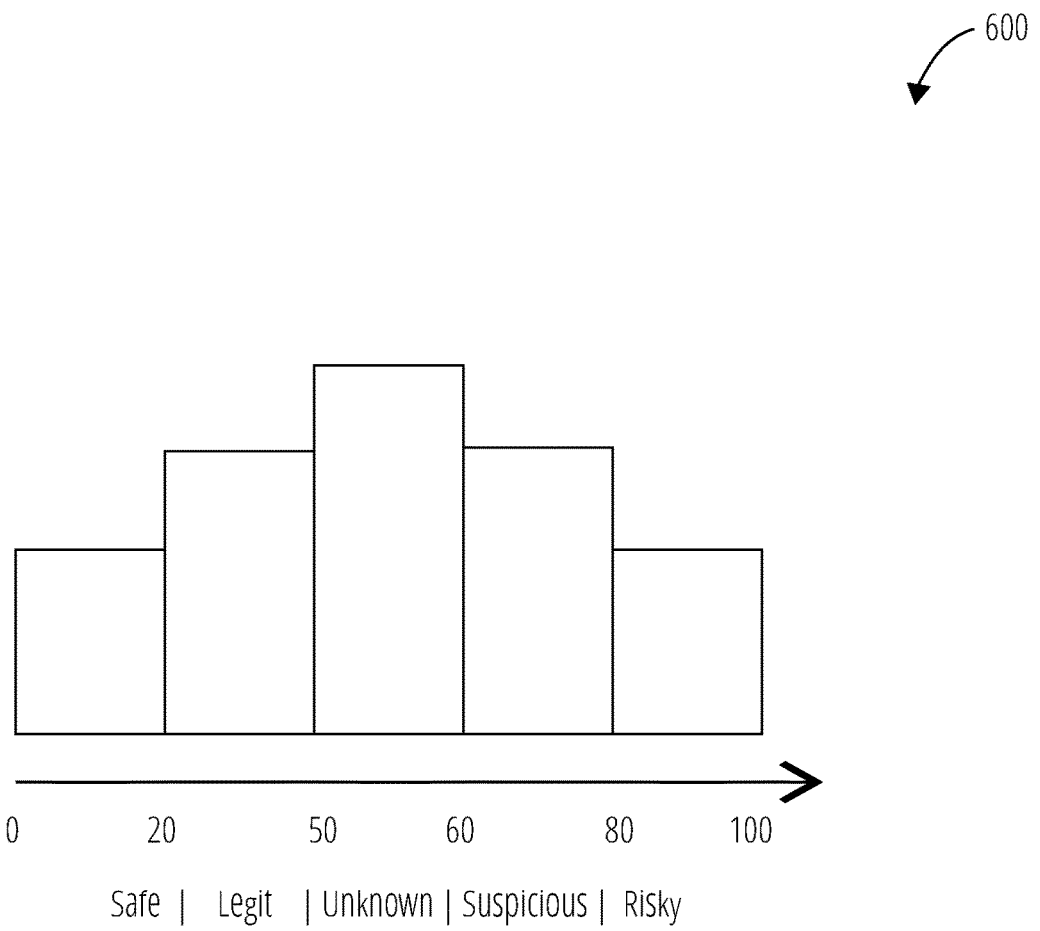
FIG. 6 illustrates a graph 600 in accordance with one embodiment.

FIG. 6 illustrates a graph 600 describing the risk score distribution. A machine learning regression model may be utilized to generate a risk score by the risk classification engine. The risk classification engine may utilize blockchain entity categorization/classification as part of the inputs to generate the risk score.

A risk score is an indicator of the risky level for an entity or event. It may also be called a reputation score. The risk score may be scored out of 100, where 100 is viewed as the highest risk entity address, and 0 as the safest entity address. The scores in between may then be bucketized into the following categories of Safe, Legitimate, Unknown, Suspicious, and Risky.

A Safe score ranges between 0-20 and describes known safe entities, such as leading compliant institutions. A Legitimate score ranges from 20-50 and describes known entities, such as medium size compliant institutions. The Unknown score ranges between 50-60 and describes new address or inactive address, and lack of observations. A Suspicious score ranges between 60-80 and is associated with identified strong ties to known risk actors. A Risky score is between 80-100 and is associated with known bad actors with direct evidence tied to terrorism, fraud, hacking, etc.

To perform the classification, a set of inputs is provided to the machine learning model. These inputs may include blockchain transaction data regarding the blockchain address, external information related to the blockchain address, such as device login IP address, geographical location, device fingerprint, etc., blockchain entity categorization from machine learning, and graph connectivity characteristic to known addresses recorded in the intelligence databases, such as hacker addresses, whitelist addresses, etc.

The machine learning model may have parameters set, such as a time decaying factor lambda. If set to 0 it means NO time decay. The expected output of the classification is the risk score for an address, the reasons for prediction—entity category, and a list of any suspicious transactions provided as a summary.

Figure 7:
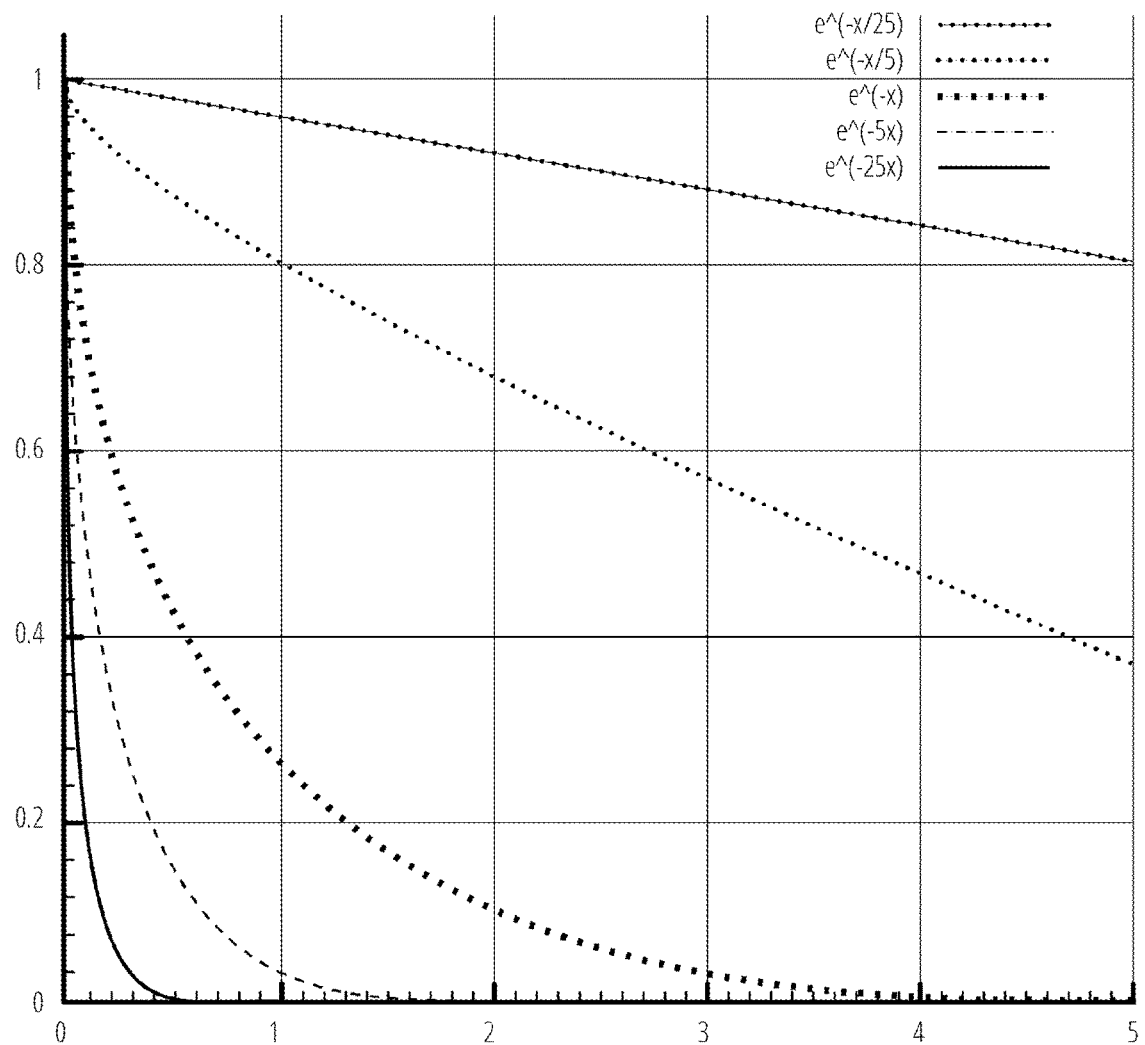
FIG. 7 illustrates a graph 700 in accordance with one embodiment.

FIG. 7 illustrates a graph 700 describing the time decaying factor for training the risk score regression model.

When training the risk score regression model, a time decaying factor may be utilized. A user may opt to configure the machine learning model such that the risk score decays as time progresses. For example, a malicious hacker address 10 years ago may have lower risk than an address established yesterday. However, the older address may still be considered risky. One way to address this issue is to implement exponential decay, where t is the time interval, and lambda is the factor controlling the speed of decaying.

$$Risk(t)=Risk(t)e^{-\lambda t}$$

An illustration of the time decay function can be seen in graph 700. Note that when lambda is set to 0, it means the time decay is disabled.

In some configurations, the machine learning model may be configured to pull additional external information to improve the results. Depending on the availability, several categories of external information that have been recorded in a financial institution's user access logs may be utilized. These categorizes of information include device login IP address, such as the device that is used by the user to access the financial institution, the geographical location, that may be based on the computer network log, a device fingerprint such as characteristics about the device, such as the browser's version, user agent string of the HTTP session, device IMEI serial number, etc., and personal information, such as passport ID, country of citizenship, etc.

In some configurations, the machine learning model may utilize graph connectivity characteristics. The machine learning model utilizing the graph connectivity characteristics may assign a high risk score based on proximity to known bad actors, such as fraud, scammers, ransomware hackers, terrorists on sanction lists, inbound/outbound fund flow, and recent time events such as recent transactions can play a bigger role than older one. An example of proximity categorization can be if the address under scrutiny is two hops from the known terrorists, with a significant inflow fund. In this case, these indicators will generate a high risk score.

In some configurations, the risk scoring regression engine may be trained with a dataset of Risky transactions (score of 100), and Safe transactions (score of 0). From this dataset, a regression model can be trained to interpolate scores from 0 to 100 based on input data.

To illustrate this the following regression function may be utilized. Note that this methodology can be also applied to nonlinear regression models, such as Gradient Boosting Trees, Support Vector Machines, Convolutional Neural Nets, etc.

$$Y_i = a + b_e X_{e_i} + b_r X_{r_i}$$

In the above equation,

Y is the output risk score.

$X_e$: Entity category features such as: Is it a mixer? An exchange? A Bot?

$X_r$: Risk score features such as: number of outgoing blockchain transactions, number of inbound addresses, geolocation, device type, etc.

The regression model coefficients: a, b1 (vector), and b2 (vector) can be estimated from the labeled dataset, by solving an optimization problem.

The "i" for Y, $X_e$, and $X_r$, indicates the "i-th" datapoint in the training dataset, where i ranges from 1 to n.

Figure 8:
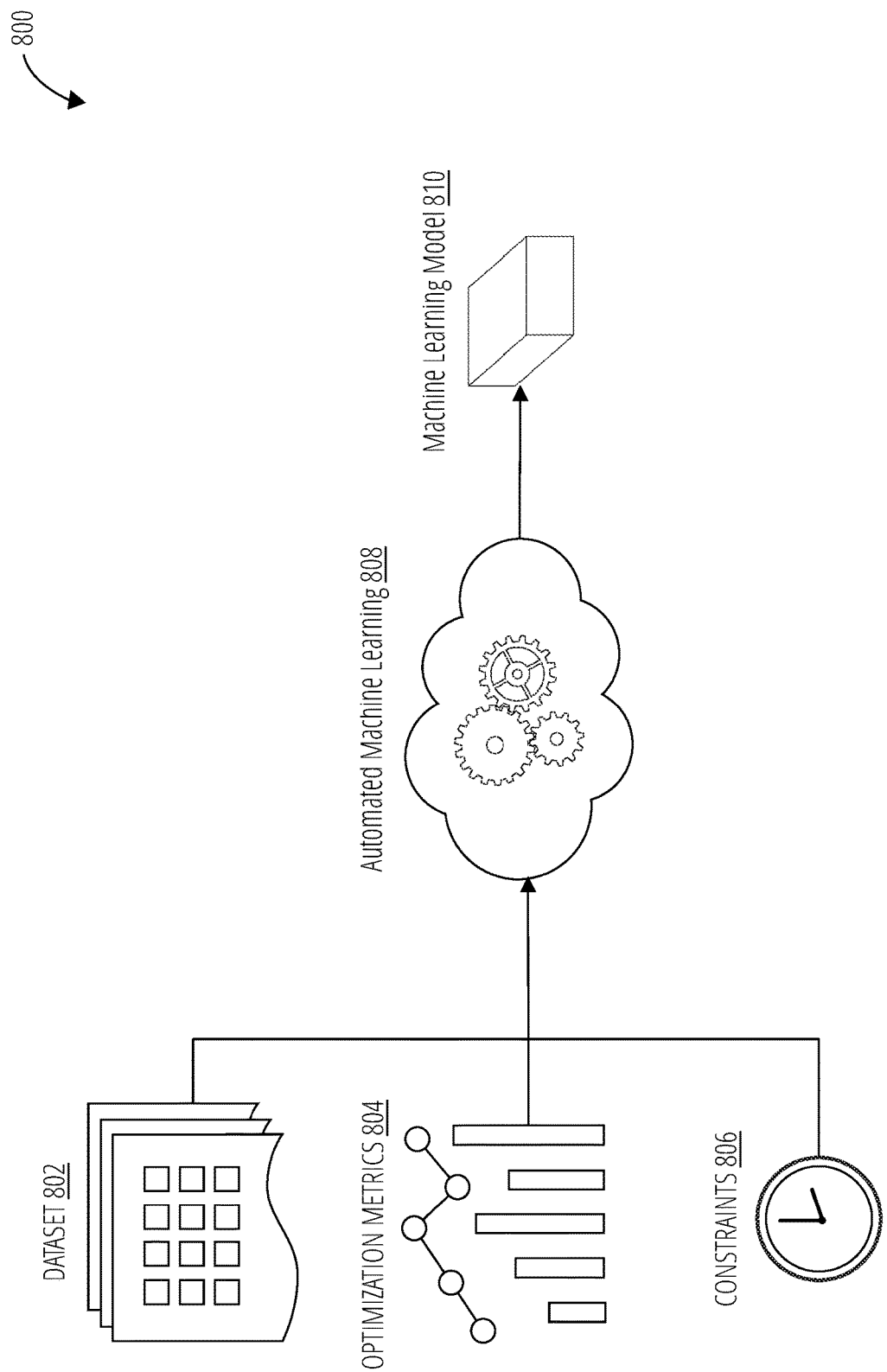
FIG. 8 illustrates an AutoML pipeline 800 in accordance with one embodiment.

FIG. 8 illustrates an AutoML pipeline 800 for selecting a machine learning model 810 utilizing Automated Machine Learning 808. For selecting a machine learning model 810, typically the three elements are provided to the Automated Machine Learning 808. These elements are the dataset 802, the optimization metrics 804, and the constraints 806. The dataset 802 is the data utilized by the user. The optimization metrics 804 are features that may be utilized to optimize the creation of model. The constraints 806 are restrictions that can be based on time or resources such as computing resources.

The AutoML pipeline is an automated process of applying the machine learning technology to an existing data modeling problem. The AutoML pipeline 800 automates the entire pipeline right from obtaining the dataset (from diverse data sources) to the development of a customized machine learning model.

In a "traditional" machine learning model, human intervention and expertise are required at multiple stages including data ingestion, data pre-processing, and prediction models. Using AutoML, each step, other than data collection and prediction, can be automated to create a customized AutoML pipeline.

The concept was derived mainly because of the fact that applying traditional machine learning methods to real-world solutions is time consuming and often challenging even for the experts. It requires vast knowledge, skill, experience and professionals or experts from different disciplines.

It does so by running systematic processes on raw data and selecting models as per the relevant information of the data. It is often called the signal in the noise.

In the traditional process of machine learning, automation comes only during model training, whereas, auto-machine learning is capable of automatically executing all the manual, tedious modeling tasks of data scientists. Original machine learning methods can take weeks or even month but with auto-machine learning, you can do any tasks like developing or comparing between models, making predictions from the insights, finding any pattern or solving any business problems within days.

Auto-machine learning can reduce the errors and bias that may occur because of a human who is designing the machine learning models in the first place. It also reduces the cost to an organization by avoiding the hiring of several experts as AutoML can be applied directly to the data pipeline. This concept can save a huge amount of time that is generally required to develop or test any machine learning model.

There are two major concepts in auto-machine learning—neural architecture search and transfer learning. Neural Architecture Search is a process that can automate the design of neural networks as per the requirement. Designing these networks, typically requires evolutionary algorithms or reinforcement learning. In reinforcement learning model strives to obtain higher accuracies because they get rewarded for success and are punished for failure. Already numerous research papers have been published on Efficient Neural Architecture Search (ENAS), Regularized Evolution for Image Classifier Architecture Search, and Learning Transferable Architectures for Scalable Image Recognition, and other concepts.

Transfer Learning is the concept where a pre-trained model is used to transfer its knowledge to a new model with similar datasets. This results in less power and computation time and gives high accuracies. It is the best option for any machine learning model having similar datasets to the one used for pre-trained models.

In machine learning and data science, experts are required to tune the algorithms. To achieve the right goal, they tune several parameters. An expert's job is to fine-tune all the parameters regularly to find the desired results. AutoML can automate task selection and manipulation for aspects such as Hyperparameter Optimization, Model Selection, Feature Selection, and Pre-Trained Models.

Hyperparameter Optimization is one of the very crucial aspects of machine learning where an expert is required to perform a hyperparameter search to achieve the right combinations in the algorithms. With AutoML, this whole process can be automated. Several libraries like Eclipse Arbiter, Google TensorFlow's Vizier or open-source Python library Spearmint allow automating hyperparameter optimization. The right combination of hyperparameters can also be found utilizing various search algorithms such as random search, Bayesian methods or grid search.

Model Selection is the process of selecting the right model for a dataset. This process can be automated through the use of AutoML. Typically, in the model selection process, an expert runs the same data through different algorithms having different hyperparameters. This process helps to determine which algorithm has the best fit for the dataset.

Feature Selection process can be automated with tools that select the most relevant features if there are pre-determined domain of inputs.

The selection or use of Pre-Trained Models can be performed by AutoML. Initially, machine learning models are dumb and with time they learn and get trained with the right data to find the pattern. The training involves models to make guesses, finding the error and then on the basis of that, correcting their guesses for making more precise predictions. In some cases, a model can be trained with any set of data and can make the right predictions on the different sets of similar data. These types of models are very useful for Computer Vision applications. Some of the well-known pre-trained models available are LeNet, VGG16, YOLO, AlexNet & Inception.

Auto-Keras

Auto-Keras is a widely used library that is used for auto-machine learning. Auto-Keras is also open-source and free to use a library that was developed by DATA Lab at Texas A&M University along with other community contributors. This library is known for providing functions that allow a user to automatically search the hyperparameters and architectures for deep learning models.

H20AutoML

H20AutoML is a distributed in-memory machine learning platform that is known for scalability. It is again an open-source tool that is packed with automated machine learning modules. It can automate whole machine learning workflow including the tuning of different models and automatic training within a defined time limit. H2O.ai can also completely automate some of the most productive and challenging tasks of data science such as model ensembling, feature engineering, model tuning and model deployment.

SMAC

Sequential Model-Based Algorithm Configuration (SMAC) is a versatile AutoML tool that is used for optimizing algorithm parameters. It is highly effective for the hyperparameter optimization of algorithms related to machine learning.

Auto-Sklearn

Auto-sklearn is built around scikit-learn library for machine learning and provides out of the box supervised machine learning solutions. It is capable of searching the best algorithms for any data set and then can optimize the hyperparameters.

Amazon Lex

Amazon Lex is a tool that can enable users to build applications such as lifelike conversational interactions and highly engaging user experiences. It can provide the functionalities of advanced deep learning like speech to text conversion or automatic speech recognition or natural language understanding. Amazon Alexa is also built around Amazon Lex with which all the developers can easily and quickly build natural language, sophisticated and conversational bots.

Auto-WEKA

Auto-WEKA is a tool that is capable of simultaneously choosing the right algorithm for a data set and can set its hyperparameters by using a fully automated approach. It leverages all the latest innovations made in Bayesian optimization. Auto-WEKA assists non-experts to identify algorithms related to machine learning and set its hyperparameters as per the applications more effectively.

Auto-Pytorch

Auto-Pytorch is a tool that can automate the process of selecting the right architecture and setting up the hyperparameters. It uses Bayesian Optimization or BOHB and multi-fidelity optimization for searching the right settings for a particular application.

ROBO

Robust Bayesian Optimization framework or ROBO is written in Python and allows a user to add or exchange Bayesian components optimizations like different regression models or acquisition functions with ease. It comes with various regression models like Random Forests, Bayesian Neural Networks or Gaussian Processes along with different acquisition functions such as the probability of improvement, expected improvement, information gain and lower confidence.

Auto Folio

This tool is known for its usage of algorithm configuration that can optimize the performance of algorithm selection systems. It does so by determining the best selection approach and all the hyperparameters.

Flex Folio

Flex Folio is an open solver and modular architecture that can integrate with several algorithm selection approaches and techniques based on the portfolio. It is also packed with a unique framework that can combine and compare existing portfolio-based algorithm techniques and selection approaches in a unified and single framework.

A machine learning algorithm may be an off-line training engine, i.e., with the ability to estimate all parameters of a regression model with the ability to ingest feature vectors as model inputs and apply a regression model to improve its results over time. Inputs comprising a set of numeric features may be conveniently described by a feature vector. Many algorithms in machine learning require a numerical representation of objects, since such representations facilitate processing and statistical analysis. An example of reaching a two-way classification from a feature vector includes calculating the scalar product between the feature vector and a vector of weights, comparing the result with a threshold, and deciding the class based on the comparison. Algorithms for classification from a feature vector include nearest neighbor classification, neural networks, and statistical techniques such as Bayesian approaches.

Figure 9:
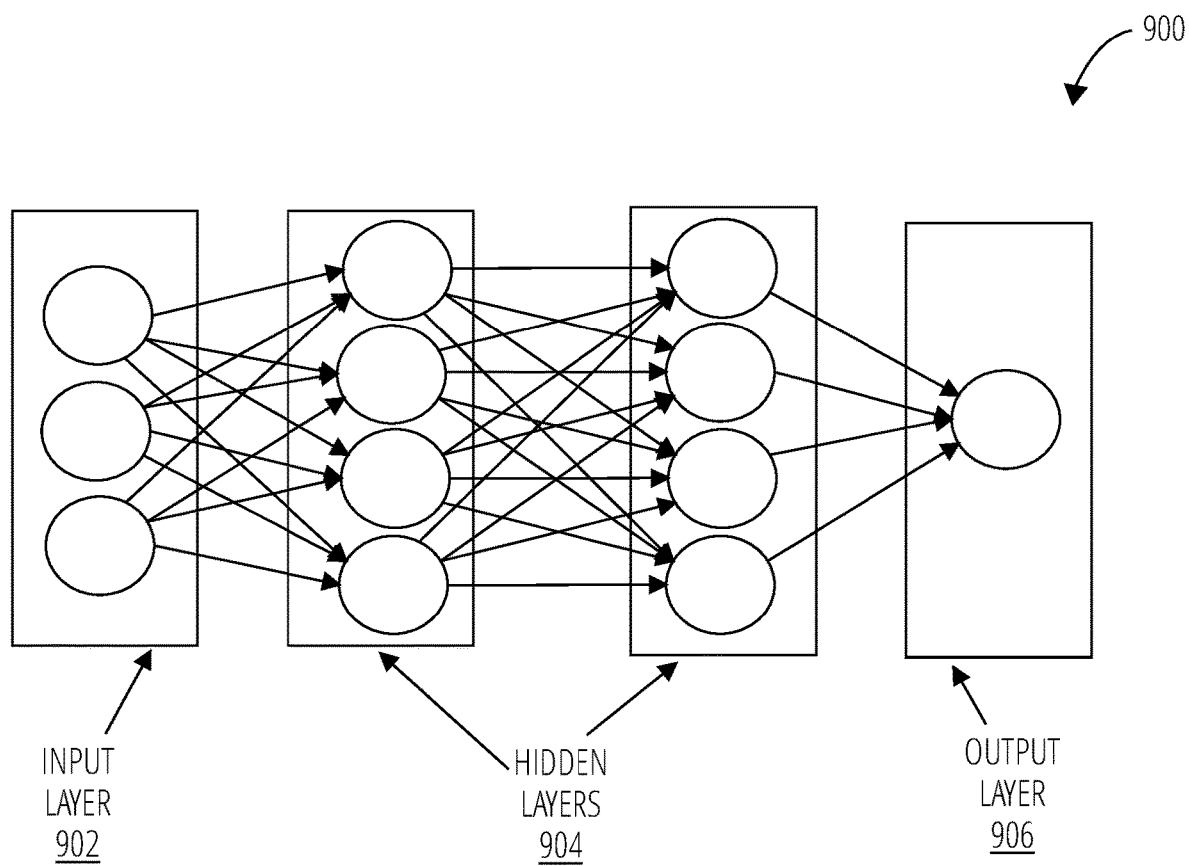
FIG. 9 illustrates a basic deep neural network 900 in accordance with one embodiment.

In some configurations, a machine learning algorithm may be implemented as a deep learning neural network. FIG. 9 illustrates a basic deep neural network 900 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 902), to the last layer (the output layer 906), possibly after traversing one or more intermediate layers, called hidden layers 904.

Figure 10:
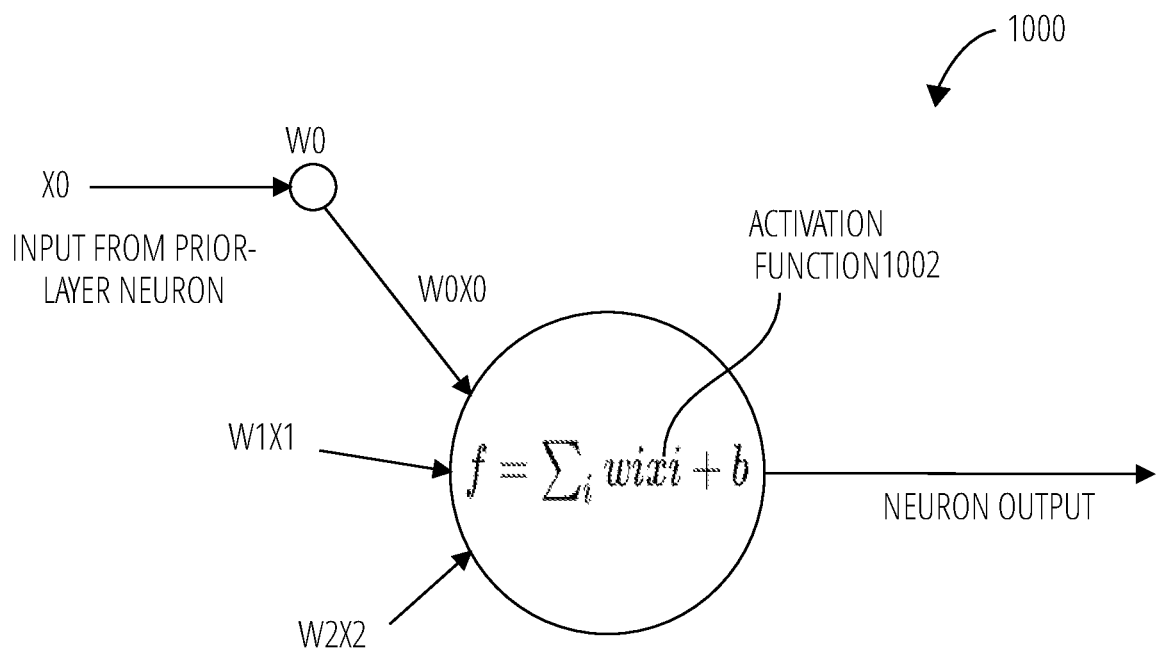
FIG. 10 illustrates an artificial neuron 1000 in accordance with one embodiment.

Referring to FIG. 10, an artificial neuron 1000 receiving inputs from predecessor neurons consists of the following components:
inputs $x_i$;
weights $w_i$ applied to the inputs;
an optional threshold (b), which stays fixed unless changed by a learning function; and
an activation function 1002 that computes the output from the previous neuron inputs and threshold, if any.

An input neuron has no predecessor but serves as input interface for the whole network. Similarly, an output neuron has no successor and thus serves as output interface of the whole network.

The network includes connections, each connection transferring the output of a neuron in one layer to the input of a neuron in a next layer. Each connection carries an input x and is assigned a weight w.

The activation function 1002 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the network.

Decision tree algorithms belong to the family of supervised learning algorithms. Unlike other supervised learning algorithms, decision tree algorithms can be used for solving regression and classification problems.

A general motive for using decision tree learning is to create a training model which can be used to predict class or value of target variables by learning decision rules inferred from prior data (training data).

Decision tree learning is one of the predictive modelling approaches used in statistics, data mining and machine learning. It uses a decision tree (as a predictive model) to go from observations about an item (represented in the branches) to conclusions about the item's target value (represented in the leaves). Tree models where the target variable can take a discrete set of values are called classification trees. In these tree structures, leaves represent class labels and branches represent conjunctions of features that lead to those class labels. Decision trees where the target variable can take continuous values (typically real numbers) are called regression trees. Decision trees are among the most popular machine learning algorithms given their intelligibility and simplicity.

Figure 11:
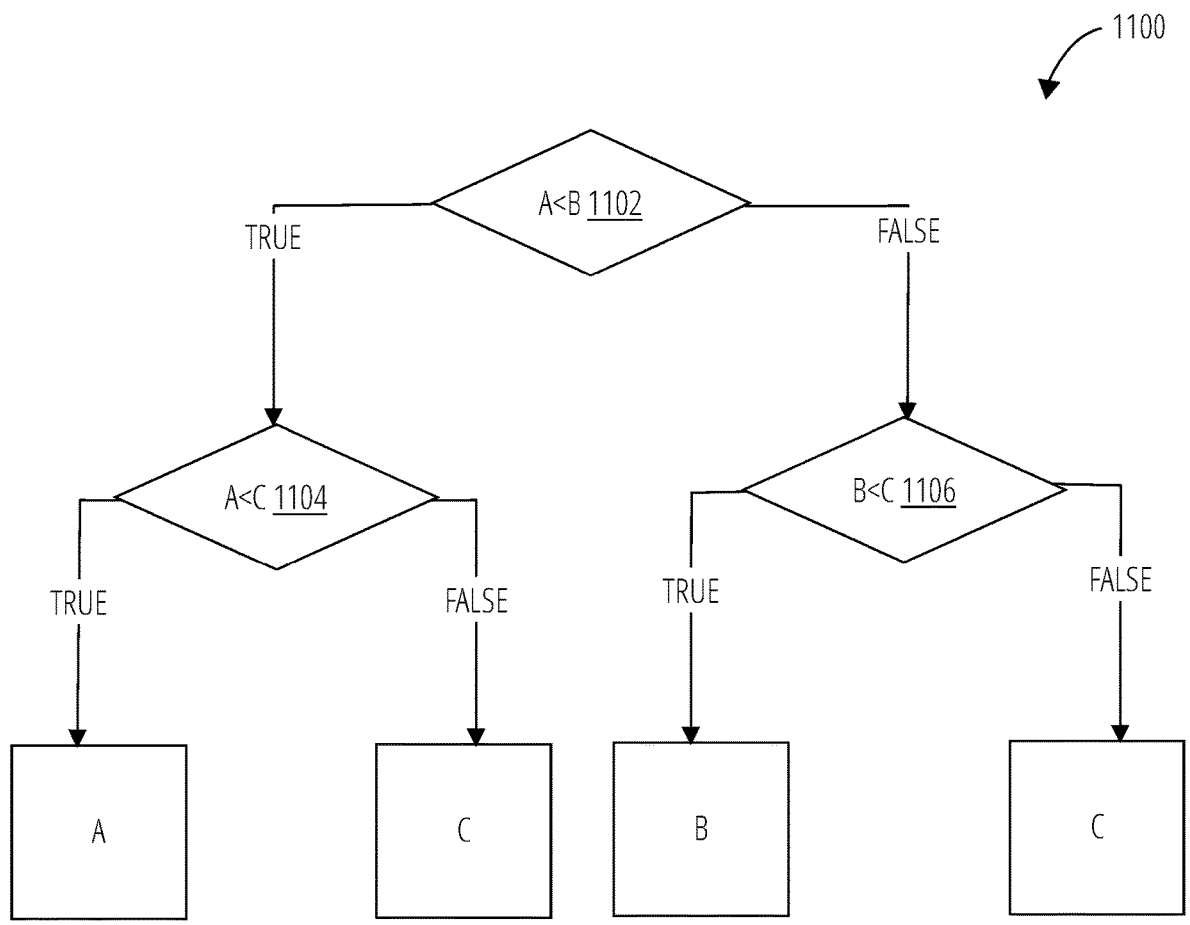
FIG. 11 illustrates a decision tree 1100 in accordance with one embodiment.

FIG. 11 illustrates an example decision tree 1100. The decision tree 1100 is shown with decision blocks representing nodes that branch based on the truth or falsity of statement in the decision node. In the decision tree 1100, the decision block 1102 makes the statement that "A<B", if this statement is true the decision branch is followed to decision block 1104 or decision block 1106 if the statement is false. If the statement was true, decision block 1104 presents the statement "A<C" which branches into end nodes ending with either A, if the statement is true, or C, if the statement is false. Similarly, if the statement was false, the decision block 1106 presents the statement "B<C" which branches into end nodes ending with either B, if the decision is true, or C, if the statement is false.

In decision analysis, a decision tree can be used to visually and explicitly represent decisions and decision making. In data mining, a decision tree describes data (but the resulting classification tree can be an input for decision making). The goal is to create a model that predicts the value of a target variable based on several input variables.

A decision tree is a simple representation for classifying examples. For this example, assume that all of the input features have finite discrete domains, and there is a single target feature called the "classification." Each element of the domain of the classification is called a class. A decision tree or a classification tree is a tree in which each internal (non-leaf) node is labeled with an input feature. The arcs coming from a node labeled with an input feature are labeled with each of the possible values of the target feature or the arc leads to a subordinate decision node on a different input feature. Each leaf of the tree is labeled with a class or a probability distribution over the classes, signifying that the data set has been classified by the tree into either a specific class, or into a particular probability distribution (which, if the decision tree is well-constructed, is skewed towards certain subsets of classes).

A tree is built by splitting the source set, constituting the root node of the tree, into subsets—which constitute the successor children. The splitting is based on a set of splitting rules based on classification features. This process is repeated on each derived subset in a recursive manner called recursive partitioning. The recursion is completed when the subset at a node has all the same values of the target variable, or when splitting no longer adds value to the predictions. This process of top-down induction of decision trees (TDIDT) is an example of a greedy algorithm, and it is by far the most common strategy for learning decision trees from data.

In data mining, decision trees can be described also as the combination of mathematical and computational techniques to aid the description, categorization and generalization of a given set of data.

Data comes in records of the form:

$$(x, Y) = (x_1, x_2, x_3, \ldots, x_n, Y)$$

The dependent variable, Y, is the target variable that one is trying to understand, classify or generalize. The vector x is composed of the features $x_1, x_2, x_3$, etc., that are used for that task.

There are many types of decision trees that may be utilized that vary depending on their purpose. In data mining, there are of two main types of decision trees, a classification tree and a regression tree. A classification tree analysis occurs where the predicted outcome is the class (discrete) to which the data belongs. A regression tree analysis occurs where the predicted outcome can be considered a real number (e.g. the price of a house, or a patient's length of stay in a hospital).

The term Classification And Regression Tree (CART) analysis is an umbrella term used to refer to both of the above procedures. Trees used for regression and trees used for classification have some similarities—but also some differences, such as the procedure used to determine where to split.

Another type of decision tree is a decision stream. Decision streams avoid the problems of data exhaustion and formation of unrepresentative data samples in decision tree nodes by merging the leaves from the same and/or different levels of predictive model structure. With an increasing of the number of samples in nodes and a reducing of the tree width, decision streams preserve statistically representative data and allow extremely deep graph architecture that can consist of hundreds of levels.

Some techniques, often called ensemble methods, construct more than one decision tree. An example of these are boosted trees and bootstrap aggregated trees. Boosted trees incrementally build an ensemble by training each new instance to emphasize the training instances previously mismodeled. A typical example is AdaBoost (i.e., Adaptive Boosting). These can be used for regression-type and classification-type problems. Bootstrap aggregated (or bagged) decision trees build multiple decision trees by repeatedly resampling training data with replacement, and voting the trees for a consensus prediction. A specific type of bootstrap aggregated decision trees is a random forest classifier.

Gradient boosting is a machine learning technique for regression and classification problems, which produces a prediction model in the form of an ensemble of weak prediction models, typically decision trees. It builds the model in a stage-wise fashion like other boosting methods do, and it generalizes them by allowing optimization of an arbitrary differentiable loss function.

n many supervised learning problems one has an output variable y and a vector of input variables x described via a joint probability distribution P(x,y). Using a training set $\{(x_1, y_1), \ldots (x_n, y_n)\}$ of known values of x and corresponding values of y, the goal is to find an approximation $\widehat{F}(x)$ a to a function F(x) that minimizes the expected value of some specified loss function L(y, F(x)):

$$\widehat{F} = \underset{P}{\mathrm{argmin}}\, \mathbb{E}_{x,y}[L(y, F(x))]$$

The gradient boosting method assumes a real-valued y and seeks an approximation $\widehat{F}(x)$ in the form of a weighted sum of functions $h_i(x)$ from some class $\mathcal{H}$, called base (or weak) learners:

$$\widehat{F}(x) = \sum_{i=1}^{M} \gamma h_i(x) + const.$$

In accordance with the empirical risk minimization principle, the method tries to find an approximation $\widehat{F}(x)$ that minimizes the average value of the loss function on the training set, i.e., minimizes the empirical risk. It does so by starting with a model, consisting of a constant function $F_0(x)$, and incrementally expands it in a greedy fashion:

$$F_0(x) = \underset{\gamma}{\mathrm{argmin}} \sum_{i=1}^{n} L(y_i, \gamma),$$

$$F_m(x) = F_{m-1}(x) + \underset{h_m \in \mathcal{H}}{\mathrm{argmin}} \left[ \sum_{i=1}^{n} L(y_i, F_{m-1}(x_i) + h_m(x_i)) \right]$$

In the above equation, $h_m \in \mathcal{H}$ is a base learner function.

Unfortunately, choosing the best function h at each step for an arbitrary loss function L is a computationally infeasible optimization problem in general. Therefore, the approach is restricted to a simplified version of the problem.

The idea is to apply a steepest descent step to this minimization problem (functional gradient descent). If the continuous case is considered, i.e. where $\mathcal{H}$ is the set of arbitrary differentiable functions on R, the model would be updated in accordance with the following equations $$F_m(x) = F_{m-1}(x) - \gamma_m \sum_{i=1}^{n} \nabla F_{m-1} L(y_i, F_{m-1}(x_i))$$

$$\gamma_m = \underset{\gamma}{\mathrm{argmin}} \sum_{i=1}^{n} L(y_i, F_{m-1}(x_i) - \gamma \nabla F_{m-1} L(y_i, F_{m-1}(x_i)))$$

In the above equations, where the derivatives are taken with respect to the functions $F_i$ for $i \in \{1, \ldots, m\}$, and γm is the step length. In the discrete case however, i.e. when the set $\mathcal{H}$ is finite, the candidate function h was chosen as the closest to the gradient of L for which the coefficient γ may then be calculated with the aid of line search on the above equations. Note that this approach is a heuristic and therefore doesn't yield an exact solution to the given problem, but rather an approximation.

Gradient boosting is typically used with decision trees (especially CART trees) of a fixed size as base learners. Generic gradient boosting at the m-th step would fit a decision tree $h_m(x)$ to pseudo-residuals. Let $J_m$ be the number of its leaves. The tree partitions the input space into $J_m$ disjoint regions $R_{1m}, \ldots, R_{J_m m}$ and predicts a constant value in each region. Using the indicator notation, the output of $h_m(x)$ for input x can be written as the sum:

$$h_m(x) = \sum_{j=1}^{J_m} b_{jm} 1 R_{jm}(x)$$

In the equation above, $b_{jm}$ is the value predicted in the region $R_{jm}$.

Then the coefficients $b_{jm}$ are multiplied by some value $\gamma_{jm}$, chosen using line search so as to minimize the loss function, and the model is updated as follows:

$$F_m(x) = F_{m-1}(x) + \gamma_m h_m(x), \gamma_m = \underset{\gamma}{\operatorname{argmin}} \sum_{i=1}^{n} L(y_i, F_{m-1}(x_i) + \gamma h_m(x_i))$$

Algorithms for constructing decision trees usually work top-down, by choosing a variable at each step that best splits the set of items. Different algorithms use different metrics for measuring "best" results. These generally measure the homogeneity of the target variable within the subsets. One example of a metric is Gini impurity.

Gini impurity is utilized by the CART (classification and regression tree) algorithm for classification trees and as a measure of how often a randomly chosen element from the set would be incorrectly labeled if it was randomly labeled according to the distribution of labels in the subset. The Gini impurity can be computed by summing the probability $p_i$ of an item with label $i$ being chosen times the probability $$\sum_{k \neq i} p_i = 1 - p_i$$

of a mistake in categorizing that item. It reaches its minimum (zero) when all cases in the node fall into a single target category.

The Gini impurity is also an information theoretical measure and corresponds to Tsallis Entropy with deformation coefficient $q=2$, which in physics is associated with the lack of information in out-of-equilibrium, non-extensive, dissipative and quantum systems. For the limit $q \to 1$ one recovers the usual Boltzmann-Gibbs or Shannon entropy. In this sense, the Gini impurity is but a variation of the usual entropy measure for decision trees.

To compute Gini impurity for a set of items with J classes, suppose $i \in \{1, 2, \ldots, J\}$, and let $p_i$ be the fraction of items labeled with class i in the set.

$$I_G(p) = \sum_{i=1}^{J} p_i \sum_{k \neq i} p_k =$$

$$\sum_{i=1}^{J} p_i(1-p_i) = \sum_{i=1}^{J} (p_i - p_i^2) = \sum_{i=1}^{J} p_i - \sum_{i=1}^{J} p_i^2 = 1 - \sum_{i=1}^{J} p_i^2$$

Some of the advantages of using decisions trees are:

Ability to handle both numerical and categorical data compared to other techniques that are usually specialized in analyzing datasets that have only one type of variable. (For example, relation rules can be used only with nominal variables while neural networks can be used only with numerical variables or categorical converted to 0-1 values.)

Little data preparation is required compared to other techniques that often require data normalization. Since trees can handle qualitative predictors, there is no need to create dummy variables.

Uses a white box or open-box model. If a given situation is observable in a model the explanation for the condition is easily explained by Boolean logic. By contrast, in a black box model, the explanation for the results is typically difficult to understand, for example with an artificial neural network.

Possible to validate a model using statistical tests. That makes it possible to account for the reliability of the model.

Non-statistical approach that makes no assumptions of the training data or prediction residuals; e.g., no distributional, independence, or constant variance assumptions Performs well with large datasets. Large amounts of data can be analyzed using standard computing resources in reasonable time.

Mirrors human decision making more closely than other approaches. This may be useful when modeling human decisions/behavior.

Robust against co-linearity, particularly boosting

In built feature selection. Additional irrelevant features will be less used so that they can be removed on subsequent runs. The hierarchy of attributes in a decision tree reflects the importance of attributes. It means that the features on top are the most informative.

Decision trees can approximate any Boolean function XOR.

A regression model comprises algorithms and analysis. Regression analysis is a set of statistical processes for estimating the relationships among variables. It includes many techniques for modeling and analyzing several variables, when the focus is on the relationship between a dependent variable and one or more independent variables. More specifically, regression analysis helps one understand how the typical value of the dependent variable changes when any one of the independent variables is varied, while the other independent variables are held fixed. Regression analysis additionally estimates the conditional expectation of a dependent variable given the independent variables— that is, the average value of the dependent variable when the independent variables are fixed.

Regression is a method of modelling a target value based on independent predictors. This method is mostly utilized for forecasting and determining cause and effect relationship between variables. Regression techniques mostly differ based on the number of independent variables and the type of relationship between the independent and dependent variables.

Figure 12:
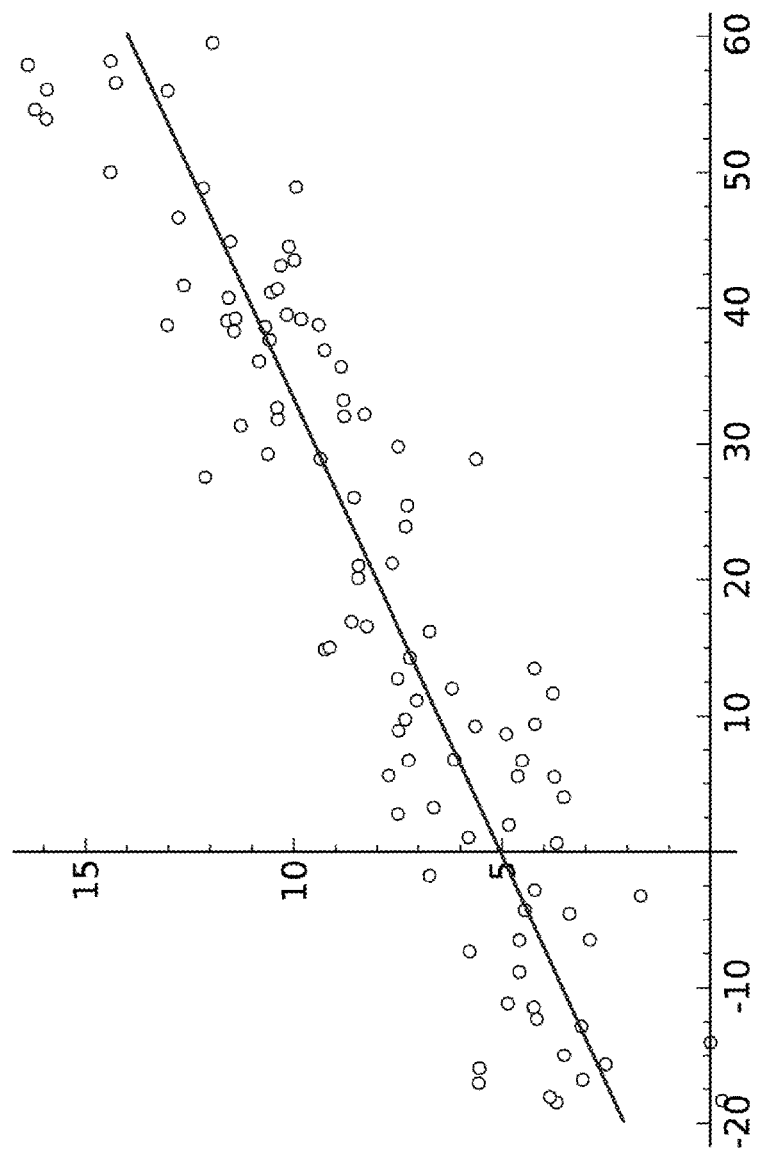
FIG. 12 illustrates a graph 1200 showing a best fit line.

Simple linear regression is a type of regression analysis where the number of independent variables is one and there is a linear relationship between the independent(x) and dependent(y) variable. Referencing FIG. 12, the line in the graph 1200 is referred to as the best fit straight line. Based on the given data points, a line is plotted that models the points the best. The line may be modelled based on the linear equation $y = \alpha_0 + \alpha_1 * x$.

The motive of the linear regression algorithm is to find the best values for $\alpha_0$ and $\alpha_1$.

Regression analysis includes a set of machine learning methods that allows for the prediction of a continuous outcome variable (y) based on the value of one or multiple predictor variables (x).

The goal of a regression model is to build a mathematical equation that defines y as a function of the x variables. This equation may be utilized to predict the outcome (y) on the basis of new values of the predictor variables (x).

Linear regression is a technique for predicting a continuous variable. It assumes a linear relationship between the outcome and the predictor variables.

The linear regression equation may be written as $y = b0 + b*x + e$, where:

b0 is the intercept, b is the regression weight or coefficient associated with the predictor variable x.

e is the residual error

Technically, the linear regression coefficients are determined so that the error in predicting the outcome value is minimized. This method of computing the beta coefficients is called the Ordinary Least Squares method.

When there are multiple predictor variables, say x1 and x2, the regression equation may be written as y=b0+b1*x1+b2*x2+e. In some situations, there might be an interaction effect between some predictors, that is for example, increasing the value of a predictor variable x1 may increase the effectiveness of the predictor x2 in explaining the variation in the outcome variable. Note also that, linear regression models can incorporate both continuous and categorical predictor variables.

When building a linear regression model, diagnostics are performed to determine whether linear model is suitable for a data set. In some cases, the relationship between the outcome and the predictor variables may not be linear. In these situations, a non-linear regression, such as polynomial and spline regression, may be utilized.

When there are multiple predictors in the regression model, it may be necessary to select the best combination of predictor variables to build an optimal predictive model. This process is called model selection, and includes comparing multiple models containing different sets of predictors in order to select the best performing model that minimize the prediction error. Linear model selection approaches include best subsets regression and stepwise regression In some situations, such as in genomic fields, a data set may be a large multivariate data set containing some correlated predictors. In this case, the information, in the original data set, may be summarized into few new variables (called principal components) that are a linear combination of the original variables. This few principal components may be used to build a linear model, which might be more performant for the data. This approach is known as principal component-based methods, which includes principal component regression and partial least squares regression.

An alternative method to simplify a large multivariate model is to use penalized regression, which penalizes the model for having too many variables. The most well known penalized regression includes ridge regression and the lasso regression.

Although all these different regression models can be applied to a data set, comparison of the models may be needed to select the best approach that best explains data-set. To do so, statistical metrics may be utilized to compare the performance of the different models in explaining the data set and in predicting the outcome of new test data.

The best model may be defined as the model that has the lowest prediction error. The most popular metrics for comparing regression models, include:

Root Mean Squared Error, which measures the model prediction error. It corresponds to the average difference between the observed known values of the outcome and the predicted value by the model. RMSE is computed as RMSE=mean((observed−predicted)^2) %>% sqrt( ). The lower the RMSE, the better the model.

Adjusted R-square, representing the proportion of variation (i.e., information), in the data set, explained by the model. This corresponds to the overall quality of the model. The higher the adjusted R2, the better the model Note that, the above mentioned metrics should be computed on a new test data that has not been used to train (i.e., build) the model. If using a large data set with many records, the data can be split into training set (80% for building the predictive model) and test set or validation set (20% for evaluating the model performance).

One of the most robust and popular approach for estimating a model performance is k-fold cross-validation. It may be applied even on a small data set. k-fold cross-validation works as follow:

1. Randomly split the data set into k-subsets (or k-fold) (for example 5 subsets)
2. Reserve one subset and train the model on all other subsets
3. Test the model on the reserved subset and record the prediction error
4. Repeat this process until each of the k subsets has served as the test set.
5. Compute the average of the k recorded errors. This is called the cross-validation error serving as the performance metric for the model.

Taken together, the best model is the model that has the lowest cross-validation error, RMSE.

To better understand linear regression the concepts of a cost function and gradient descent are explained below.

The cost function is useful for determining the best possible values for $\alpha_0$ and $\alpha_1$ which would provide the best fit line for the data points. To determine the best values for $\alpha_0$ and $\alpha_1$, the search problem is converted into a minimization problem where the objective is to minimize the error between the predicted value and the actual value.

$$\text{minimize } \frac{1}{n}\sum_{i=1}^{n}(pred_i - y_i)^2 \qquad \text{function 1}$$

$$J = \frac{1}{n}\sum_{i=1}^{n}(pred_i - y_i)^2$$

The function above (function 1) was selected to illustrate the minimization problem. The difference between the predicted values and ground truth measures the error difference. The error difference is squared, then all data points summed up and the value is then divided by the total number of data points. This provides the average squared error over all the data points. Therefore, this cost function is also known as the Mean Squared Error (MSE) function. Utilizing this MSE function the values of $\alpha_0$ and $\alpha_1$ are changed such that the MSE value settles at the minima.

Gradient descent is a method of updating $\alpha_0$ and $\alpha_1$ to reduce the cost function(MSE). It is a process of optimizing the values of the coefficients by iteratively minimizing the error of the model on the training data. The idea is to start with some values for $\alpha_0$ and $\alpha_1$ and then change these values iteratively to reduce the cost. Gradient descent helps to determine how to change the values.

Gradient descent works by starting with random values for each coefficient. The sum of the squared errors is calculated for each pair of input and output values. A learning rate is used as a scale factor and the coefficients are updated in the direction towards minimizing the error. The process is repeated until a minimum sum squared error is achieved or no further improvement is possible.

In this method, a learning rate (alpha) parameter is selected that determines the size of the improvement step taken on each iteration of the procedure.

Figure 13:
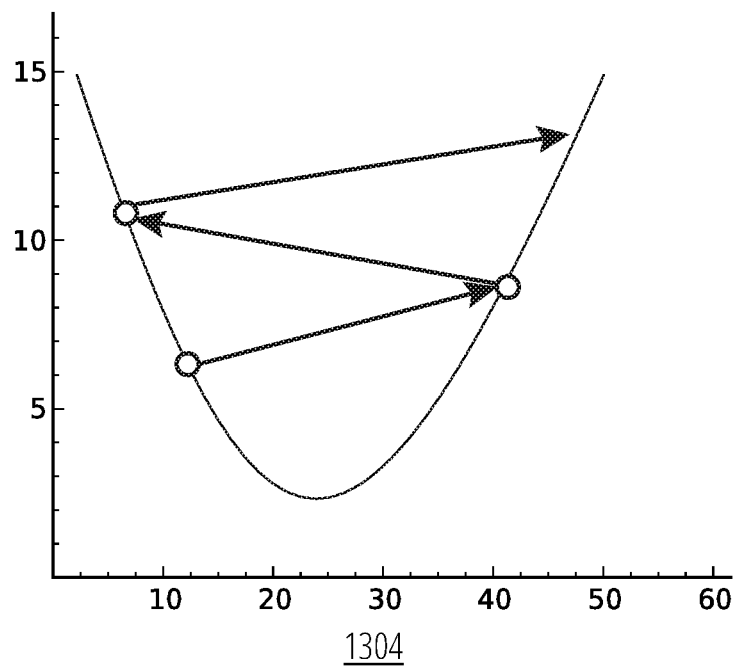
FIG. 13 displays a set graphs as examples of different learning rates.
Figure 13:
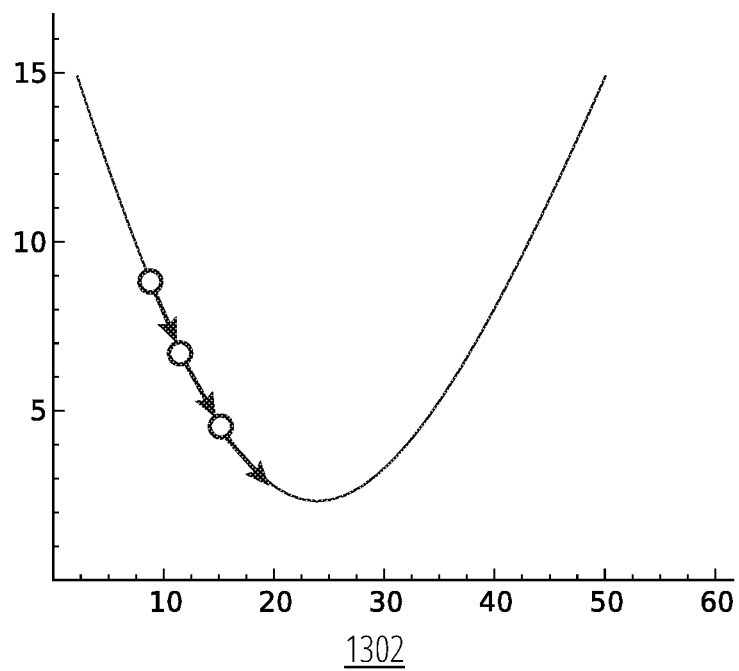

To draw an analogy, imagine a pit in the shape of U and someone is standing at the topmost point in the pit and his objective is to reach the bottom of the pit. There is a catch, he can only take a discrete number of steps to reach the bottom. If he decides to take one step at a time, he would eventually reach the bottom of the pit but this would take a longer time. If he chooses to take longer steps each time, he would reach sooner but, there is a chance that he could overshoot the bottom of the pit and not exactly at the bottom. In the gradient descent algorithm, the number of steps taken is the learning rate. This decides on how fast the algorithm converges to the minima. This concept is illustrated in FIG. 13 where graph 1304 illustrates a big learning rate the overshoots the minima, and graph 1302 illustrates a small learning rate as it approaches the minima.

In some situations, the cost function may be a non-convex function where there may be local minima but for linear regression, it is generally a convex function.

To update $\alpha_0$ and $\alpha_1$ utilizing gradient descent, gradients are taken from the cost function. To find these gradients, partial derivatives are taken with respect to $\alpha_0$ and $\alpha_1$. An example of how to identify the partial derivatives are found in the equations below $$J = \frac{1}{n}\sum_{i=1}^{n}(pred_i - y_i)^2$$

$$J = \frac{1}{n}\sum_{i=1}^{n}(a_0 + a_1 \cdot x_i - y_i)^2$$

$$\frac{\partial J}{\partial a_0} = \frac{2}{n}\sum_{i=1}^{n}(a_0 + a_1 \cdot x_i - y_i) \Rightarrow \frac{\partial J}{\partial a_0} = \frac{2}{n}\sum_{i=1}^{n}(pred_i - y_i)$$

$$\frac{\partial J}{\partial a_1} = \frac{2}{n}\sum_{i=1}^{n}(a_0 + a_1 \cdot x_i - y_i) \cdot x_i \Rightarrow \frac{\partial J}{\partial a_1} = \frac{2}{n}\sum_{i=1}^{n}(pred_i - y_i) \cdot x_i$$

$$a_0 = a_0 - a \cdot \frac{2}{n}\sum_{i=1}^{n}(pred_i - y_i)$$

$$a_1 = a_1 - \alpha \cdot \frac{2}{n}\sum_{i=1}^{n}(pred_i - y_i) \cdot x_i$$

The partial derivates are the gradients and they are utilized to update the values of $\alpha_0$ and $\alpha_1$. Alpha is the learning rate which is a hyperparameter that requires a user to specify. Selecting a smaller learning rate may converge at the minima with more accurate results but at the cost of more time, while selecting a larger learning rate may converge sooner but there is a chance that to overshoot the minima.

Gradient descent is often taught using a linear regression model because it is relatively straightforward to understand. In practice, it is useful when implemented with a very large dataset either in the number of rows or the number of columns that may not fit into memory.

Figure 14:
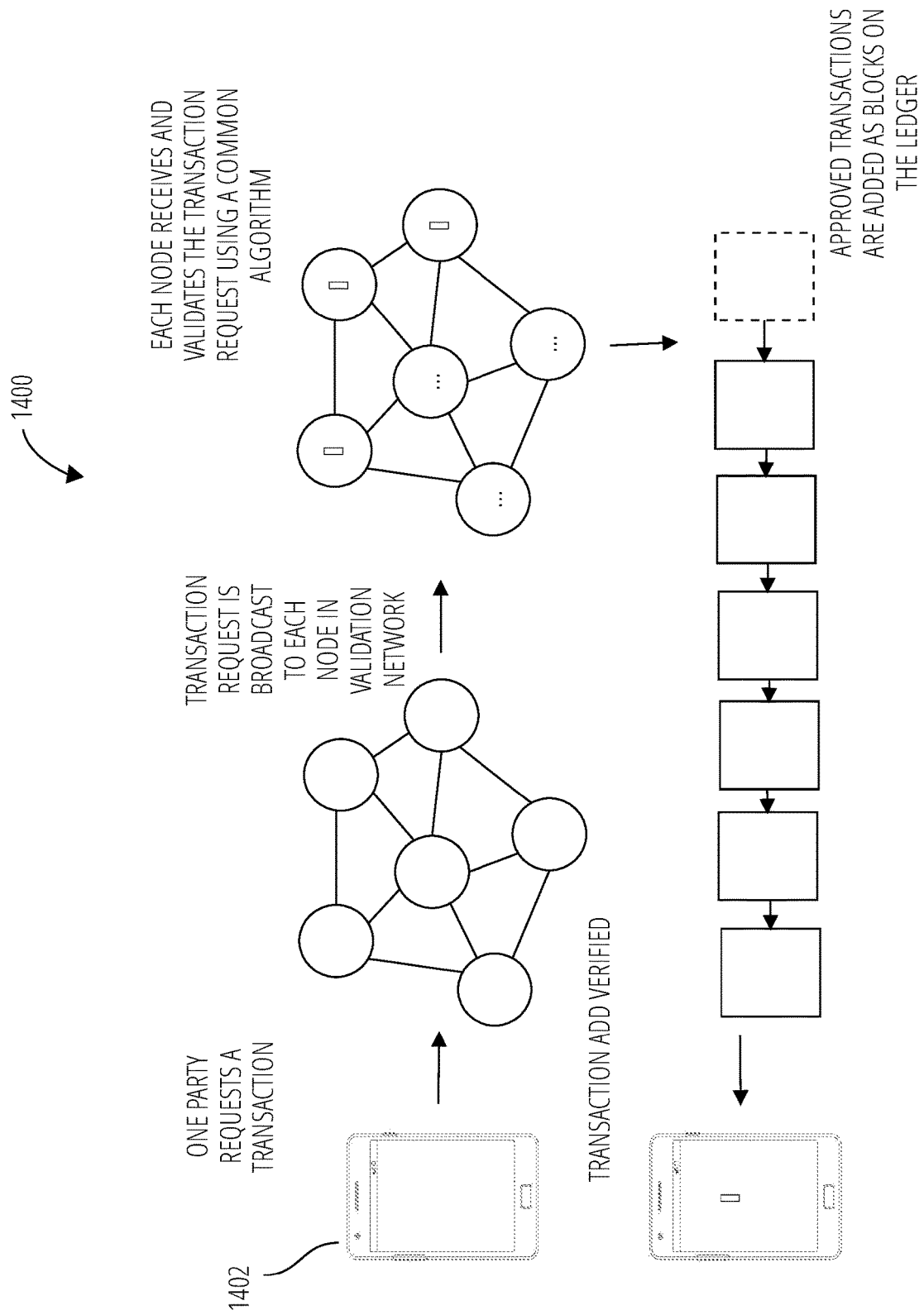
FIG. 14 illustrates a blockchain transaction process 1400 in accordance with one embodiment.

Referring to FIG. 14, a blockchain transaction process 1400 is an ever-growing set of data blocks. Each block records a collection of transactions. Blockchains distribute these transactions across a group of computers. Each computer maintains its own copy of the blockchain transactions.

A blockchain is a continuously growing list of records, called blocks, which are linked and secured using cryptography. Each block typically comprises a cryptographic hash of the previous block, a timestamp, and transaction data. By design, a blockchain is resistant to modification of the data. Blockchains may implement an open, distributed ledger that can record transactions between two parties efficiently and in a verifiable and permanent way.

A blockchain is typically managed by multiple parties collectively adhering to a protocol for inter-node communication and validating new blocks. Once recorded, the data in any given block cannot be altered retroactively without alteration of all subsequent blocks, which requires consensus among the operators.

Cryptography involving mathematical methods of keeping data secret and proving identity is utilized when recording transactions. One digital key ensures only an owner for example on a transaction requesting device 1402, can enter a transaction to the blockchain involving their assets, and another digital key lets other parties confirm it really was the owner who added the transaction.

Blockchain is resistant to tampering or other changes by utilizing a cryptographic technique called the hash. Hashing reduces data to a sequence of seemingly random characters—for example, the hash of the phrase "the quick brown fox" is "9ECB36561341D18EB65484E833EFEA61ED-C74B84CF5E6AE1B81C63533E25FC8F" using a hash method called SHA-256. Tweaking just one letter in the phrase produces a completely different hash, and you can't go backward to figure out the original data from the hash.

With blockchain, hashes are linked together so any minute change is immediately visible, not just for the block housing it but for all other blocks added later. With red flags that big for changes that small, auditing becomes easier.

Figure 15:
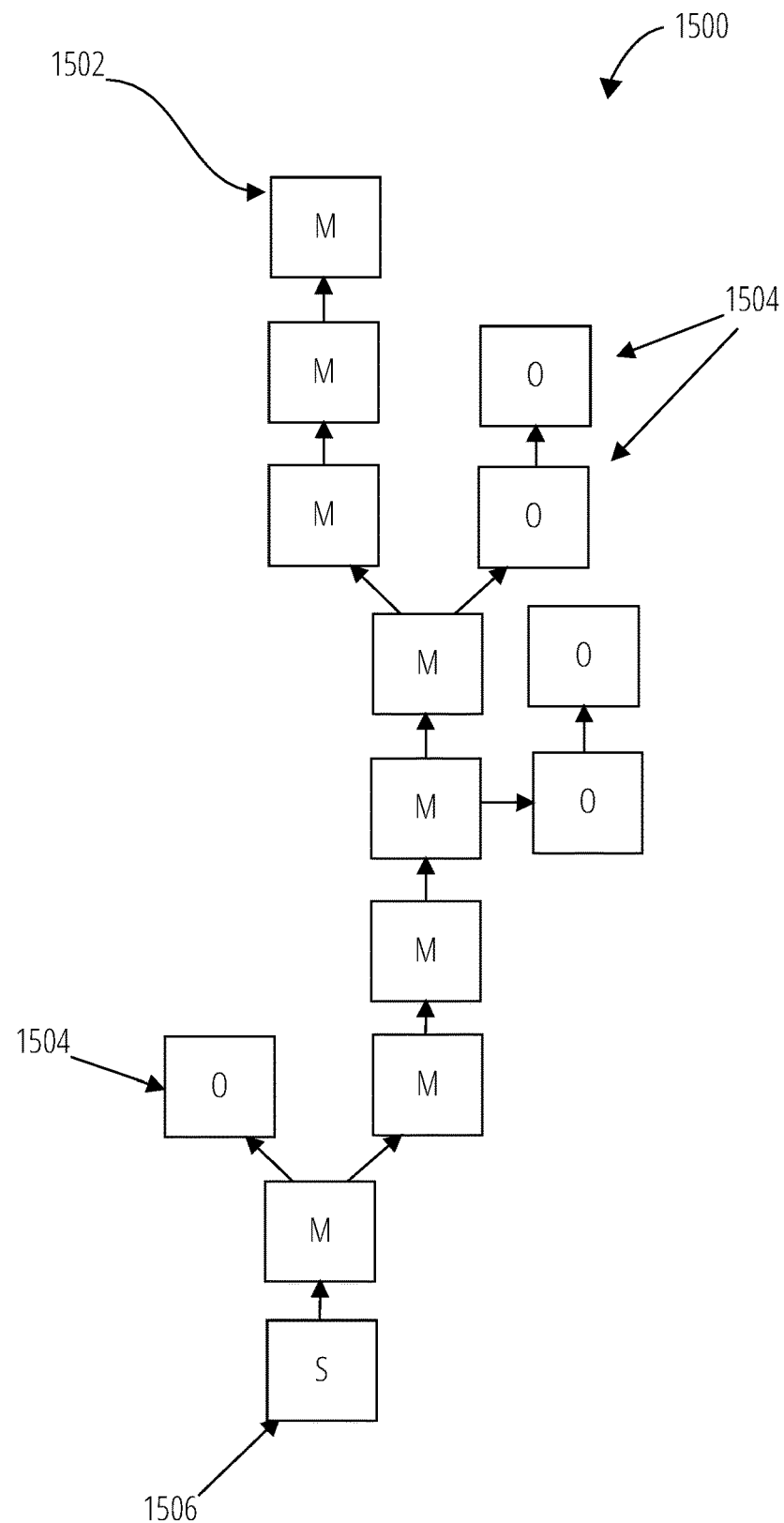
FIG. 15 illustrates a blockchain formation 1500 in accordance with one embodiment.

FIG. 15 illustrates an exemplary blockchain formation 1500. The mainchain 1502 (M blocks) comprises the longest series of blocks from the start block 1506 (S block) to the current block. Orphan blocks 1504 (O blocks) exist outside of the main chain.

Blocks hold batches of valid transactions that are hashed and encoded, for example into a Merkle tree. Each block includes the cryptographic hash of the prior block in the blockchain formation 1500, linking the two. The linked blocks form a chain. This iterative process confirms the integrity of the previous block, all the way back to the original start block 1506.

Sometimes separate blocks can be produced concurrently, creating a temporary fork. In addition to a secure hash-based history, the blockchain formation 1500 has a specified algorithm for scoring different versions of the history so that one with a higher value can be selected over others. Blocks not selected for inclusion in the mainchain 1502 are called orphan blocks 1504. Peers supporting the blockchain formation 1500 have different versions of the history from time to time. They keep only the highest-scoring version of the blockchain formation 1500 known to them. Whenever a peer receives a higher-scoring version (usually the old version with a single new block added) they extend or overwrite their local version of the blockchain formation 1500 and retransmit the improvement to their peers. There is never an absolute guarantee that any particular entry will remain in the best version of the history forever. Because blockchains are typically built to add the score of new blocks onto old blocks and because there are incentives to work only on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is always considered the valid one by the network. There are a number of methods that can be used to demonstrate a sufficient level of computation. Within a blockchain the computation is carried out redundantly rather than in the traditional segregated and parallel manner.

Figure 16:
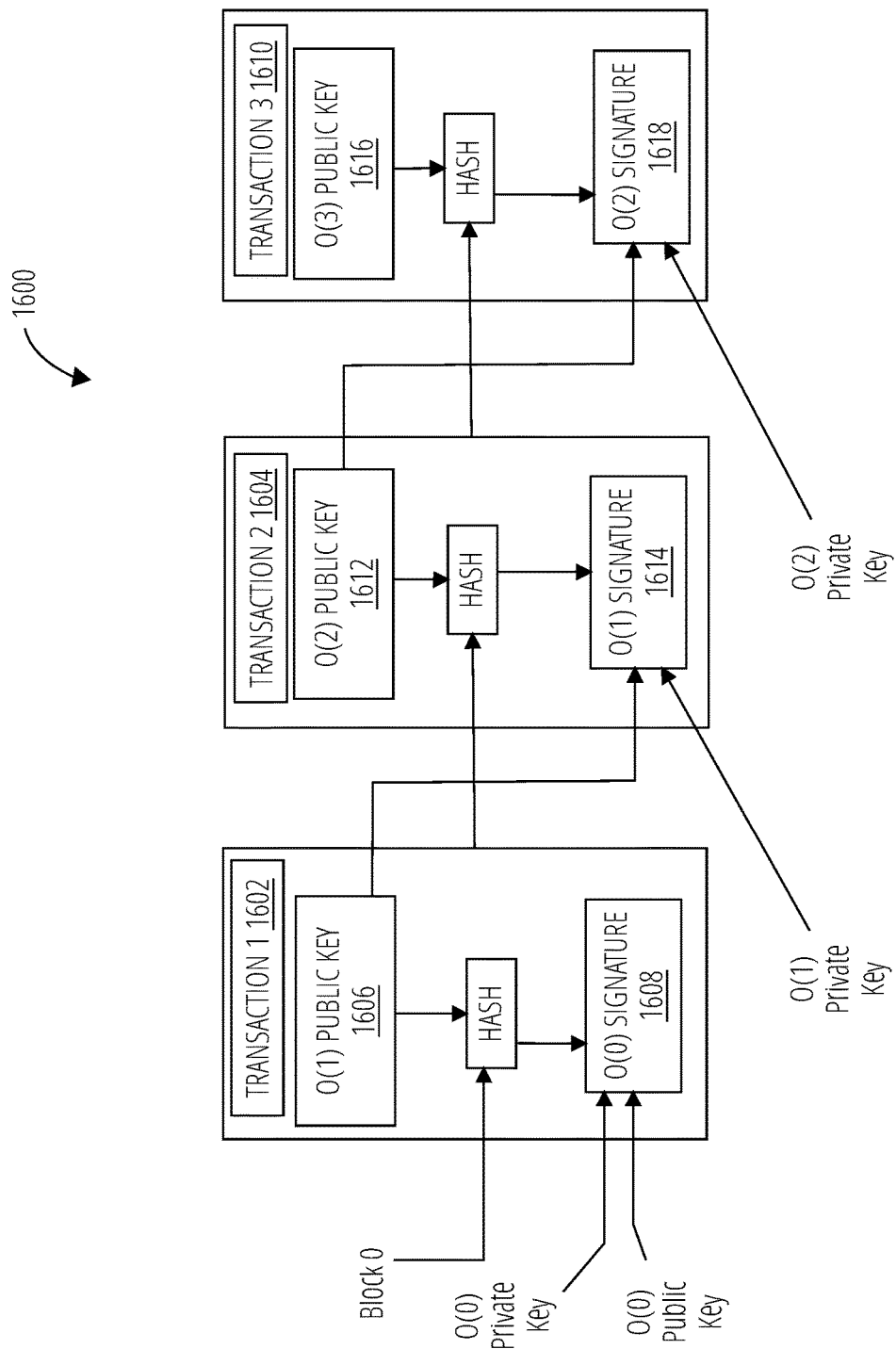
FIG. 16 illustrates a blockchain 1600 in accordance with one embodiment.

FIG. 16 illustrates an embodiment of an irreversible transaction blockchain 1600. The blockchain 1600 is a sequence of digitally signed transactions (transaction 1 1602, transaction 2 1604, and transaction 3 1610 etc.). Each transaction includes the current owners public key (block 1 owner public key 1606, block 2 owner public key 1612, and block 3 owner public key 1616 respectively) and the previous owner's signature (O(0) signature 1608, O(1) signature 1614, and O(2) signature 1618), which are generated using a hash function. The owner of a transaction can examine each previous transaction to verify the chain of ownership. Unlike traditional check endorsements, the transactions in the blockchain 1600 are irreversible, which mitigates fraud.

Figure 17:
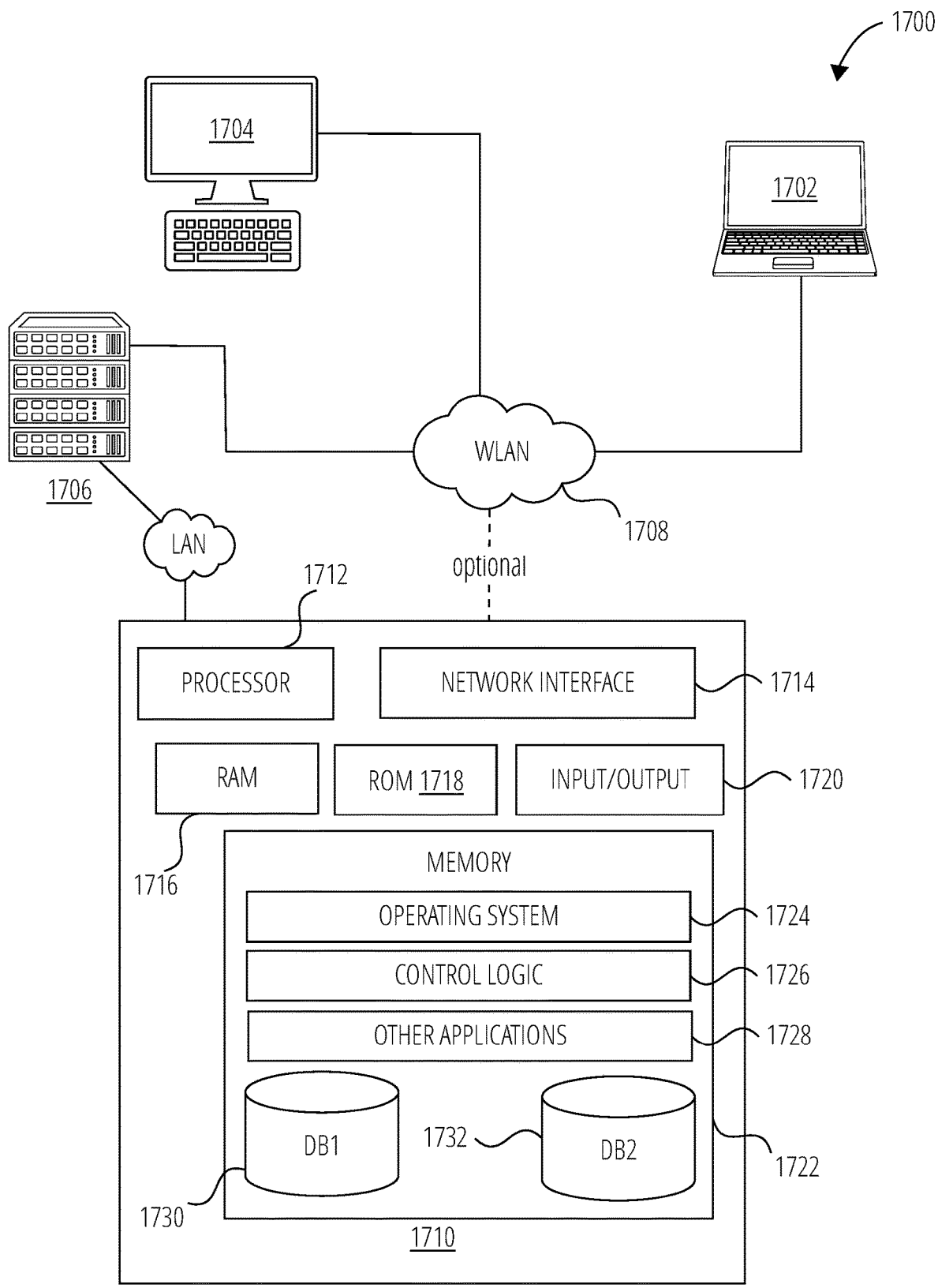
FIG. 17 depicts an illustrative system architecture and data processing device 1700 that may be used in accordance with one or more illustrative aspects described herein.

FIG. 17 illustrates one example of a system architecture and data processing device 1700 that may be used to implement one or more illustrative aspects described herein in a standalone and/or networked environment. Various network nodes data server 1710, web server 1706, computer 1704, and laptop 1702 may be interconnected via a wide area network 1708 (WAN), such as the internet. Other networks may also or alternatively be used, including private intranets, corporate networks, LANs, metropolitan area networks (MANs) wireless networks, personal networks (PANs), and the like. Network 1708 is for illustration purposes and may be replaced with fewer or additional computer networks. A local area network (LAN) may have one or more of any known LAN topology and may use one or more of a variety of different protocols, such as ethernet. Devices data server 1710, web server 1706, computer 1704, laptop 1702 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1710, web server 1706, and client computer 1704, laptop 1702. Data server 1710 provides overall access, control and administration of databases and control software for performing one or more illustrative aspects described herein. Data server data server 1710 may be connected to web server 1706 through which users interact with and obtain data as requested. Alternatively, data server 1710 may act as a web server itself and be directly connected to the internet. Data server 1710 may be connected to web server 1706 through the network 1708 (e.g., the internet), via direct or indirect connection, or via some other network. Users may interact with the data server 1710 using remote computer 1704, laptop 1702, e.g., using a web browser to connect to the data server 1710 via one or more externally exposed web sites hosted by web server 1706. Client computer 1704, laptop 1702 may be used in concert with data server 1710 to access data stored therein or may be used for other purposes. For example, from client computer 1704, a user may access web server 1706 using an internet browser, as is known in the art, or by executing a software application that communicates with web server 1706 and/or data server 1710 over a computer network (such as the internet).

Servers and applications may be combined on the same physical machines, and retain separate virtual or logical addresses, or may reside on separate physical machines. FIG. 17 illustrates just one example of a network architecture that may be used, and those of skill in the art will appreciate that the specific network architecture and data processing devices used may vary, and are secondary to the functionality that they provide, as further described herein. For example, services provided by web server 1706 and data server 1710 may be combined on a single server.

Each component data server 1710, web server 1706, computer 1704, laptop 1702 may be any type of known computer, server, or data processing device. Data server 1710, e.g., may include a processor 1712 controlling overall operation of the data server 1710. Data server 1710 may further include RAM 1716, ROM 1718, network interface 1714, input/output interfaces 1720 (e.g., keyboard, mouse, display, printer, etc.), and memory 1722. Input/output interfaces 1720 may include a variety of interface units and drives for reading, writing, displaying, and/or printing data or files. Memory 1722 may further store operating system software 1724 for controlling overall operation of the data server 1710, control logic 1726 for instructing data server 1710 to perform aspects described herein, and other application software 1728 providing secondary, support, and/or other functionality which may or may not be used in conjunction with aspects described herein. The control logic may also be referred to herein as the data server software control logic 1726. Functionality of the data server software may refer to operations or decisions made automatically based on rules coded into the control logic, made manually by a user providing input into the system, and/or a combination of automatic processing based on user input (e.g., queries, data updates, etc.).

Memory 1722 may also store data used in performance of one or more aspects described herein, including a first database 1732 and a second database 1730. In some embodiments, the first database may include the second database (e.g., as a separate table, report, etc.). That is, the information can be stored in a single database, or separated into different logical, virtual, or physical databases, depending on system design. Web server 1706, computer 1704, laptop 1702 may have similar or different architecture as described with respect to data server 1710. Those of skill in the art will appreciate that the functionality of data server 1710 (or web server 1706, computer 1704, laptop 1702) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
receiving digital on blockchain information and digital off blockchain information, wherein the receiving includes a digital asset intake engine;
extracting digital data from the digital on blockchain information and the digital off blockchain information;
contextualizing relationships based on the digital data and the digital off blockchain information and the digital on blockchain information, the contextualizing including an entity knowledge base;
analyzing the digital data and transforming the digital data to an identified behavior category, thereby creating classified risk data, wherein the analyzing and transforming includes a risk classification engine including a machine learning model;
analyzing the classified risk data and assigning a risk score to each classified risk data, wherein the analyzing and assigning includes a risk scoring regression engine and machine learning;
analyzing the classified risk data and determining if any deviations from rules or standards have or will occur, wherein the analyzing and determining includes a risk policy engine that is a rules based engine; and
taking an action on the digital on blockchain information and digital off blockchain information based on the assigned risk score and any deviations from rules or standards, wherein taking the action includes a security control system, wherein the action includes:
on condition the risk score is high:
at least one of blocking a blockchain transaction, freezing user assets, or suspending user accounts related to the blockchain transaction; and
on condition the risk score is normal:
approving the blockchain transaction.

2. The method of claim 1, wherein the digital on blockchain information and digital off blockchain information includes:
   a blockchain address;
   a transaction identification;
   user information;
   device information;
   a device IP address;
   a business type; and
   an exchange or custodian distinction.
3. The method of claim 1, wherein the entity knowledge base includes:
   a blacklist intelligence database;
   a device intelligence database;
   a computer network intelligence database; and
   a blockchain ledger.
4. The method of claim 1, wherein the risk classification engine includes:
   a decision tree classification model.
5. The method of claim 1, wherein the machine learning model includes at least one of:
   a machine learning classification model; and
   a risk score model to calculate the risk score.
6. The method of claim 5, wherein the machine learning classification model is an AutoML model comprising:
   preparing a labeled dataset;
   pre-processing the labeled dataset;
   extracting AutoML features;
   transforming AutoML features;
   training an AutoML model;
   evaluating metrics of the AutoML model;
   selecting a best machine learning model using an automated selection process; and
   serializing the best machine learning model.
7. The method of claim 6, wherein the AutoML model is at least one of:
   an offline training pipeline including:
      feature extraction and transformation;
      parallel model training;
      model metric evaluation; and
      model selection;
   an online prediction pipeline in a cloud or a decentralized blockchain node, the online prediction pipeline including:
      feature extraction and transformation;
      model prediction based on one or more models; and
      result formatting.
8. The method of claim 1, wherein the machine learning classification model is a behavior based model comprising:
   recognizing behavioral characteristics in at least one feature category for an entity, wherein the feature categories include:
      a statistics feature category;
      a topology feature category;
      a temporal feature category;
      a linkage feature category;
      a derived feature category; and
      a sequential feature category;
   identifying at least one of:
      exchange behavioral wallet addresses using exchange behavior characteristics;
      a money laundering behavioral address;
      a bot behavioral address; and
      a bad actor group cluster.
9. The method of claim 5, wherein the machine learning classification model is a regression model for the risk score, the regression model including:
   input features comprising at least one of:
      blockchain transactions including blockchain addresses; and
      external information related to blockchain addresses;
   parameters including a time decaying factor lambda;
   output including:
      the risk scores of the blockchain addresses;
      reasons for the risk scores; and
      a suspicious transaction summary.
10. A risk management system for blockchain digital assets, the system comprising:
   a digital asset intake engine, configured to receive digital on blockchain information and digital off blockchain information, and extract digital data from the digital on blockchain information and the digital off blockchain information;
   an entity knowledge base engine configured to contextualize relationships based on the digital data and the digital off blockchain information and the digital on blockchain information;
   a risk classification engine including a machine learning model, the risk classification engine configured to analyze the digital data and transform the digital data to an identified behavior category, thereby creating classified risk data;
   a risk scoring regression engine including machine learning, the risk scoring regression engine configured to analyze the classified risk data and assign a risk score to each classified risk data;
   a risk policy engine, wherein the risk policy engine is a rules based engine; and
   a security control system configured to take an action on the digital on blockchain information and digital off blockchain information based on the assigned risk score, wherein the security control system is configured to:
      on condition the risk score is high:
         at least one of block a blockchain transaction, freeze user assets, or suspend user accounts related to the blockchain transaction; and
      on condition the risk score is normal:
         approve the blockchain transaction.
11. The risk management system of claim 10, wherein the digital asset intake engine includes:
   a blockchain address;
   a transaction identification;
   user information;
   device information;
   a device IP address;
   a business type; and
   an exchange or custodian distinction.
12. The risk management system of claim 10, wherein the entity knowledge base includes:
   a blacklist intelligence database;
   a device intelligence database;
   a computer network intelligence database; and
   a blockchain ledger.
13. The risk management system of claim 10, wherein the entity knowledge base engine updates the digital on blockchain information and digital off blockchain information upon receiving threat intelligence to include a reentrancy vulnerability pattern.
14. The risk management system of claim 10, wherein the risk classification engine includes:
   a decision tree classification model.

15. The risk management system of claim 10, wherein the risk scoring regression engine includes:
  a machine learning classification model; and
  a risk score model to calculate the risk score.

16. The risk management system of claim 10, wherein the machine learning model includes at least one of:
  a machine learning classification model; and
  a risk score model to calculate the risk score.

17. The risk management system of claim 16, wherein the machine learning classification model is an AutoML model comprising:
  preparing a labeled dataset;
  pre-processing the labeled dataset;
  extracting AutoML features;
  transforming AutoML features;
  training an AutoML model;
  evaluating metrics of the AutoML model;
  selecting a best machine learning model using an automated selection process; and
  serializing the best machine learning model.

18. The risk management system of claim 17, wherein the AutoML model is at least one of:
  an offline training pipeline including:
    feature extraction and transformation;
    parallel model training;
    model metric evaluation; and
    model selection;
  an online prediction pipeline in a cloud or a decentralized blockchain node, the online prediction pipeline including:
    feature extraction and transformation;
    model prediction based on one or more models; and
    result formatting.

19. The risk management system of claim 10, wherein the machine learning classification model is a behavior based model comprising:
  recognizing behavioral characteristics in at least one feature category for an entity, wherein the feature categories include:
    a statistics feature category;
    a topology feature category;
    a temporal feature category;
    a linkage feature category;
    a derived feature category; and
    a sequential feature category;
  identifying at least one of:
    exchange behavioral wallet addresses using exchange behavior characteristics;
    a mixer behavioral address;
    a tumbler behavioral address;
    a money laundering behavioral address;
    a bot behavioral address; and
    a bad actor group cluster.

20. The risk management system of claim 10, wherein the machine learning classification model is a regression model for the risk score, the regression model including:
  input features comprising at least one of:
    blockchain transactions including blockchain addresses; and
    external information related to blockchain addresses;
  parameters including a time decaying factor lambda;
  output including:
    the risk scores of the blockchain addresses;
    reasons for the risk scores; and
    a suspicious transaction summary.

* * * * *